(12) United States Patent
Baxter

(10) Patent No.: US 9,161,514 B2
(45) Date of Patent: Oct. 20, 2015

(54) AUTOMATED FEEDING DEVICE AND METHOD

(71) Applicant: Brad Baxter, Bloomfield Hills, MI (US)

(72) Inventor: Brad Baxter, Bloomfield Hills, MI (US)

(73) Assignee: Automated Pet Care Products, Inc., Auburn Hills, MI (US)

(\*) Notice: Subject to any disclaimer, the term of this patent is extended or adjusted under 35 U.S.C. 154(b) by 0 days.

(21) Appl. No.: 13/836,508

(22) Filed: Mar. 15, 2013

(65) Prior Publication Data

US 2014/0060441 A1    Mar. 6, 2014

Related U.S. Application Data

(60) Provisional application No. 61/697,512, filed on Sep. 6, 2012.

(51) Int. Cl.
*A01K 5/01* (2006.01)
*A01K 5/02* (2006.01)

(52) U.S. Cl.
CPC .............. *A01K 5/0275* (2013.01); *A01K 5/0291* (2013.01)

(58) Field of Classification Search
CPC ........................... A01K 5/0291; A01K 5/0275
USPC ............ 119/51.01, 51.02, 51.04, 51.5, 51.15, 119/53, 52.4, 57, 57.4, 57.5, 57.92, 61.5, 119/81, 56.1
See application file for complete search history.

(56) References Cited

U.S. PATENT DOCUMENTS

| | | | | |
|---|---|---|---|---|
| 2,042,455 | A * | 6/1936 | Barrott | 222/454 |
| 2,869,638 | A * | 1/1959 | Sullivan | 222/650 |
| 3,645,422 | A * | 2/1972 | Cretors | 222/169 |
| 3,894,660 | A * | 7/1975 | Snyder | 222/170 |
| 4,000,719 | A | 1/1977 | Richards | |
| 5,054,657 | A | 10/1991 | Morse et al. | |
| 5,259,533 | A * | 11/1993 | Kornfein et al. | 222/170 |
| 5,908,007 | A | 6/1999 | Duin | |
| 5,957,082 | A | 9/1999 | Budman et al. | |
| 6,234,111 | B1 * | 5/2001 | Ulman et al. | 119/54 |
| 6,748,898 | B2 * | 6/2004 | Ulman et al. | 119/57.92 |
| 7,111,581 | B2 | 9/2006 | Kubala et al. | |
| 2002/0096120 | A1 | 7/2002 | Busha | |

FOREIGN PATENT DOCUMENTS

WO    2010/065385 A1    6/2010

\* cited by examiner

*Primary Examiner* — Rob Swiatek
*Assistant Examiner* — Ebony Evans
(74) *Attorney, Agent, or Firm* — The Dobrusin Law Firm, P.C.

(57) ABSTRACT

A feeder comprising: a base assembly and a rotatable housing, wherein the rotatable housing comprises: a pivotable portioning divider and an adjustment mechanism for adjusting the position of the pivotable portioning divider so that the pivotable portioning divider can be adjusted to vary an amount of food dispensed by the feeder.

20 Claims, 26 Drawing Sheets

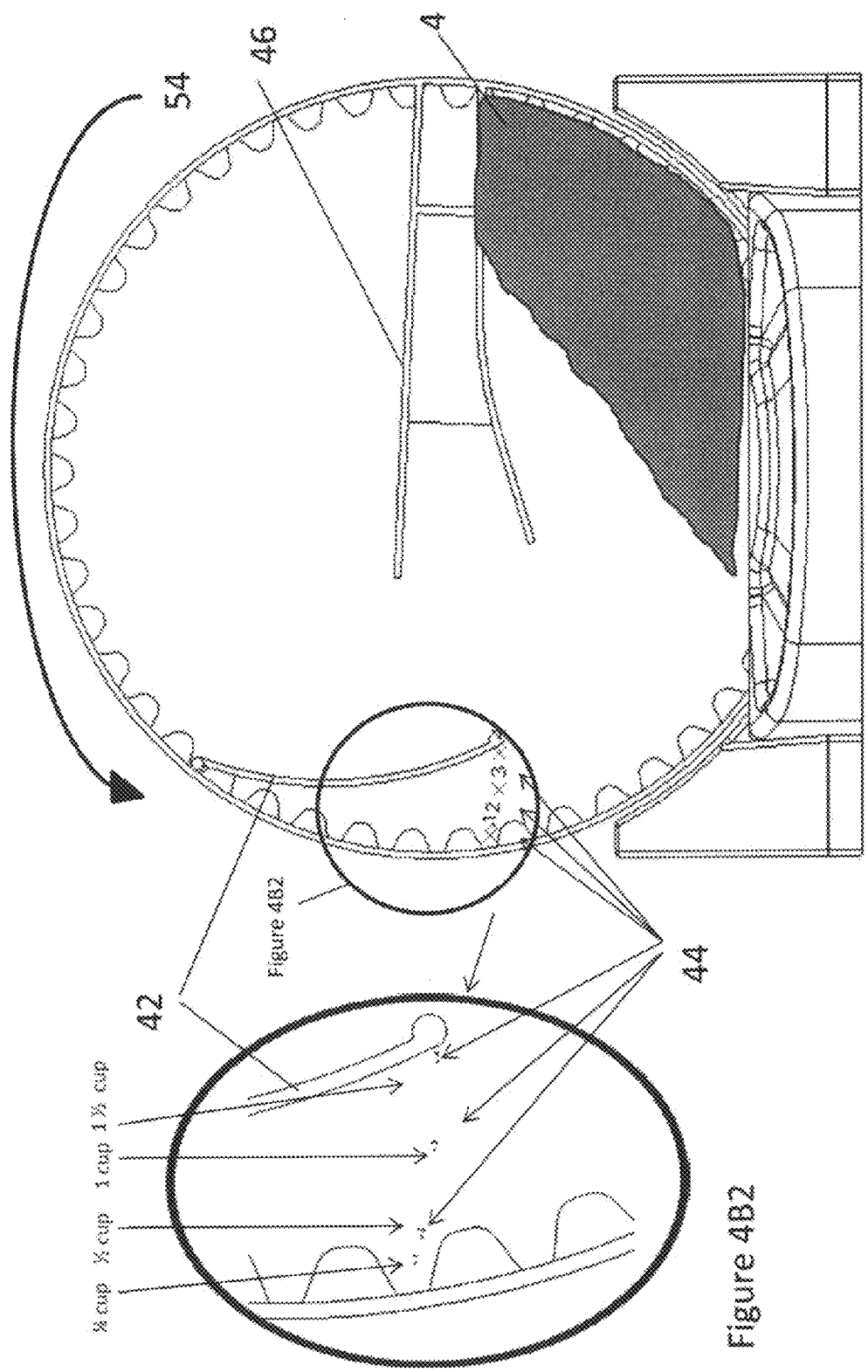

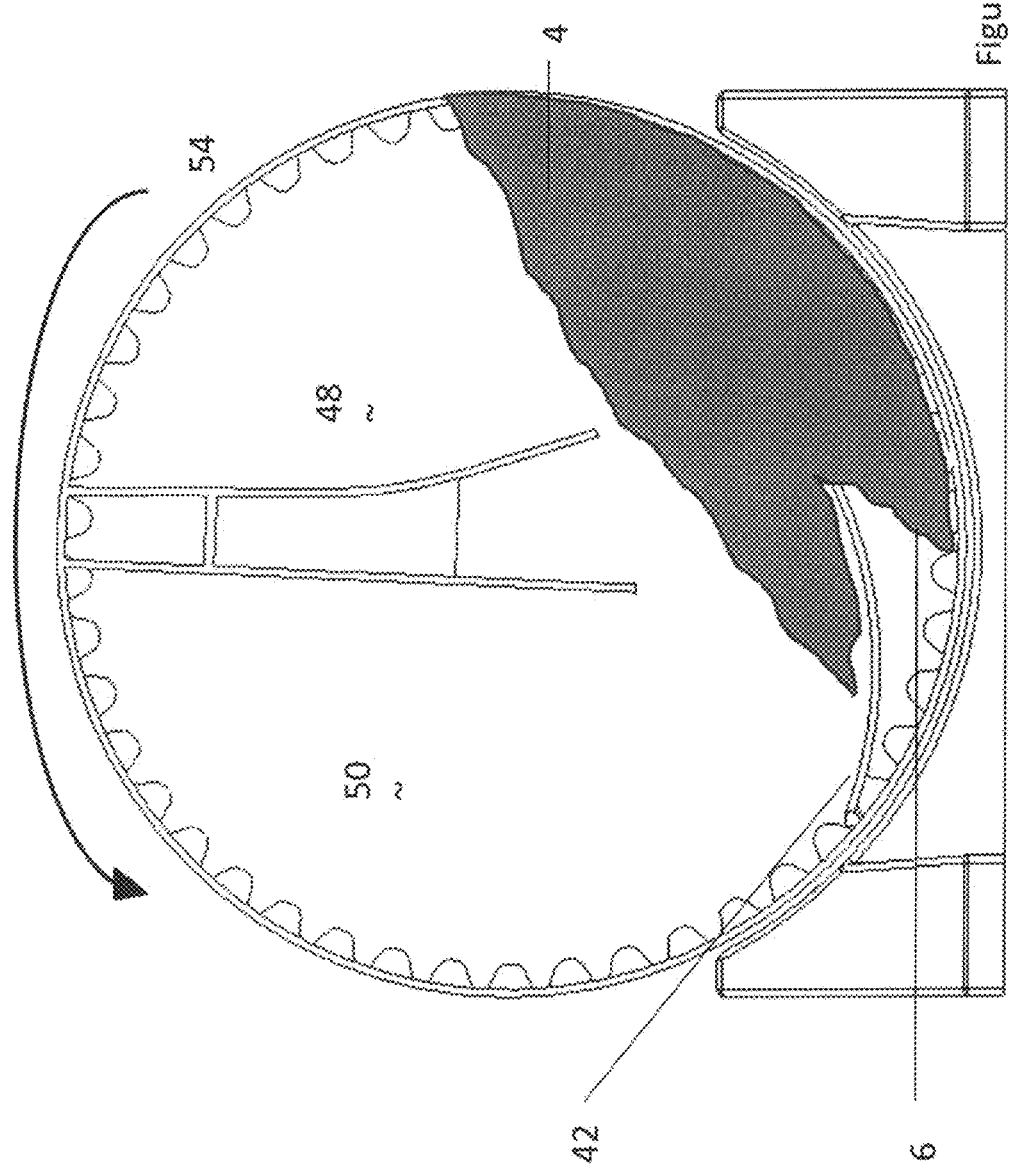

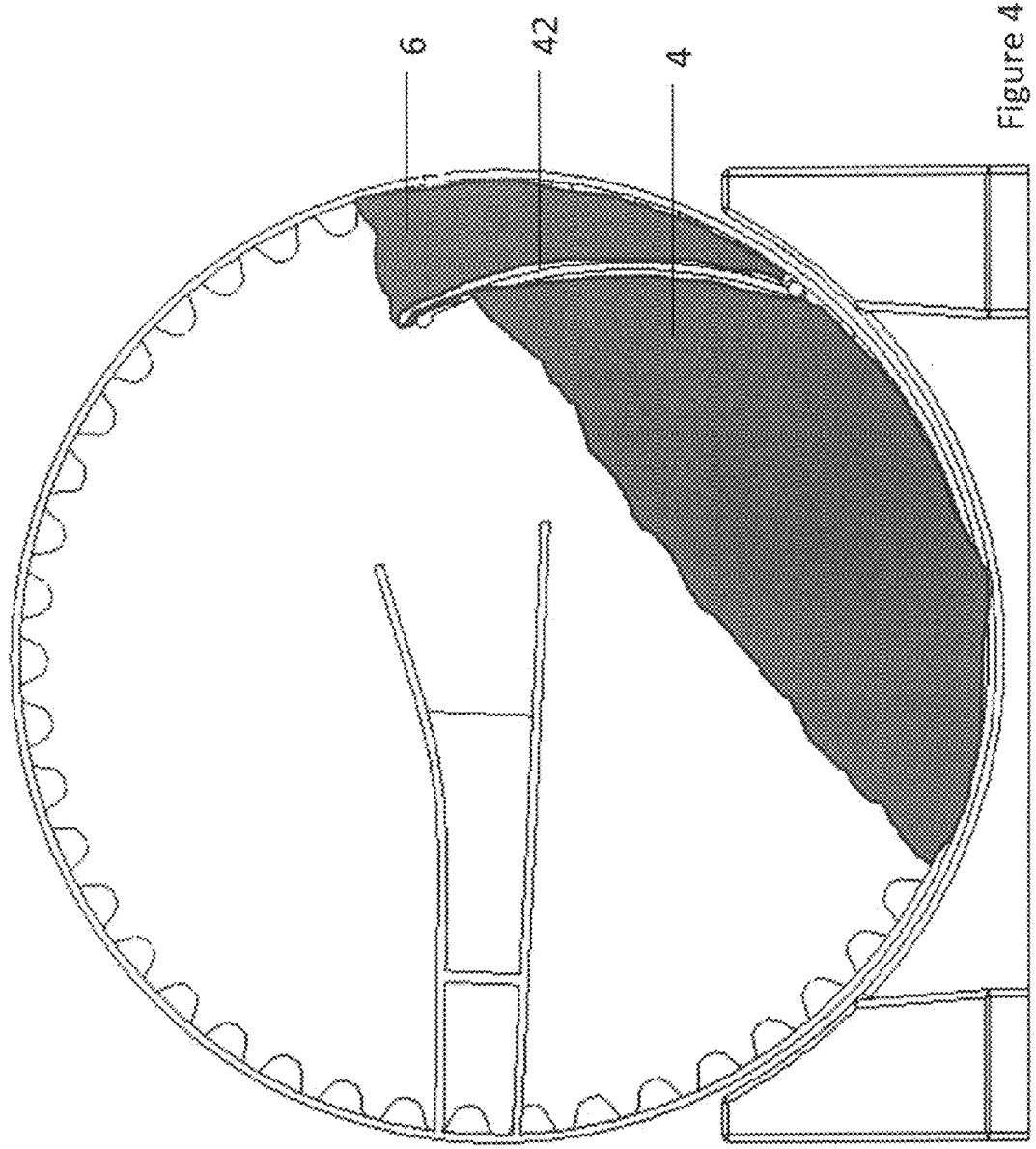

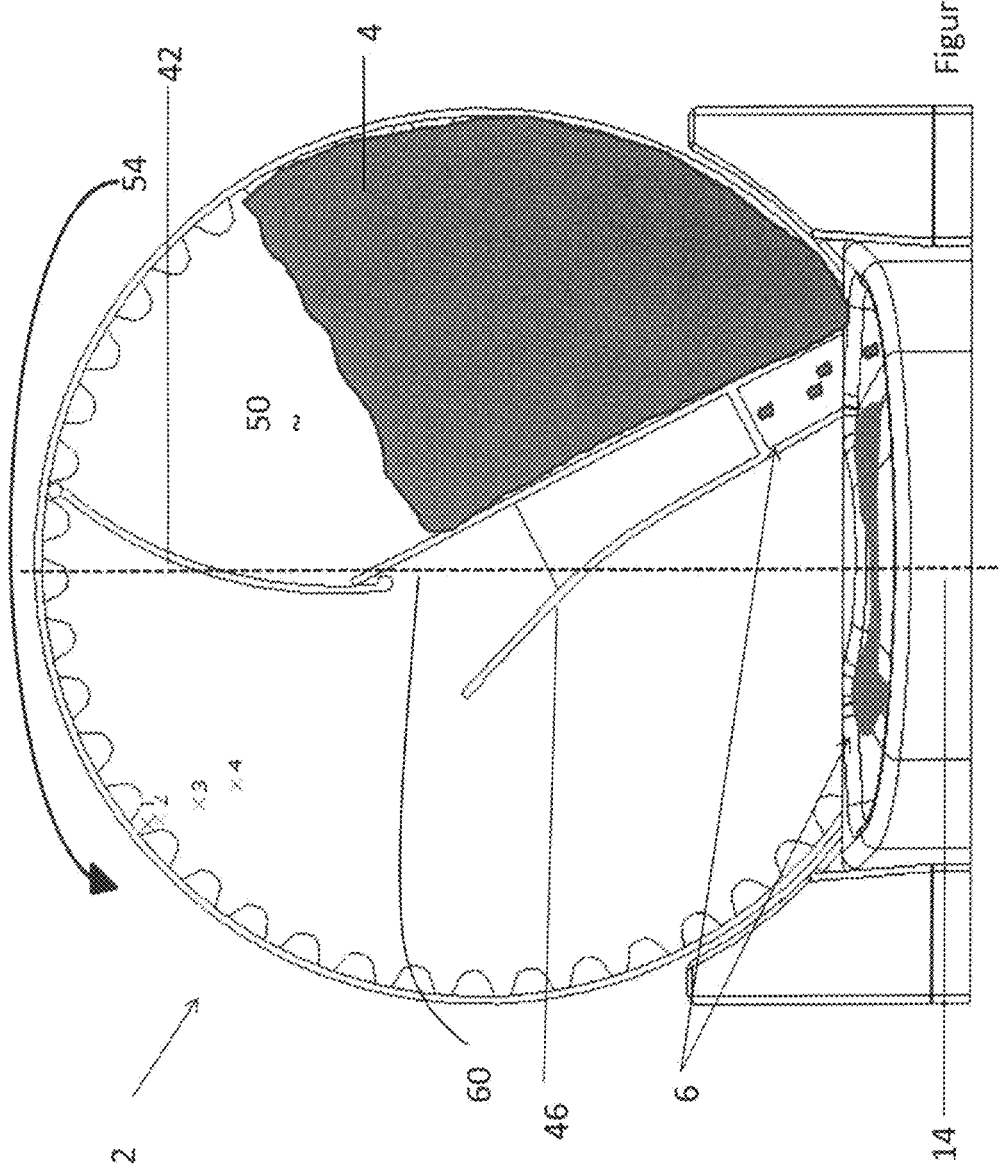

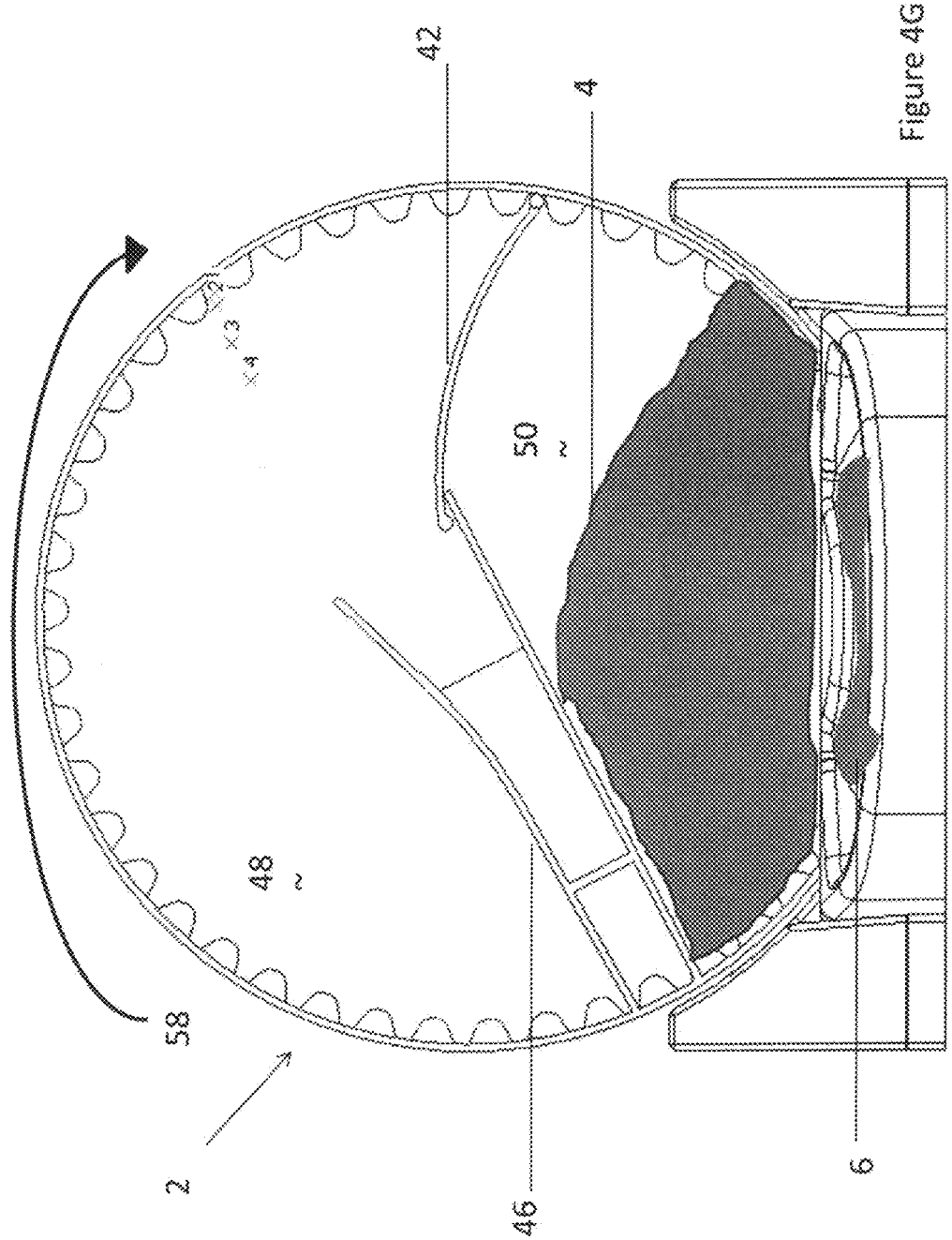

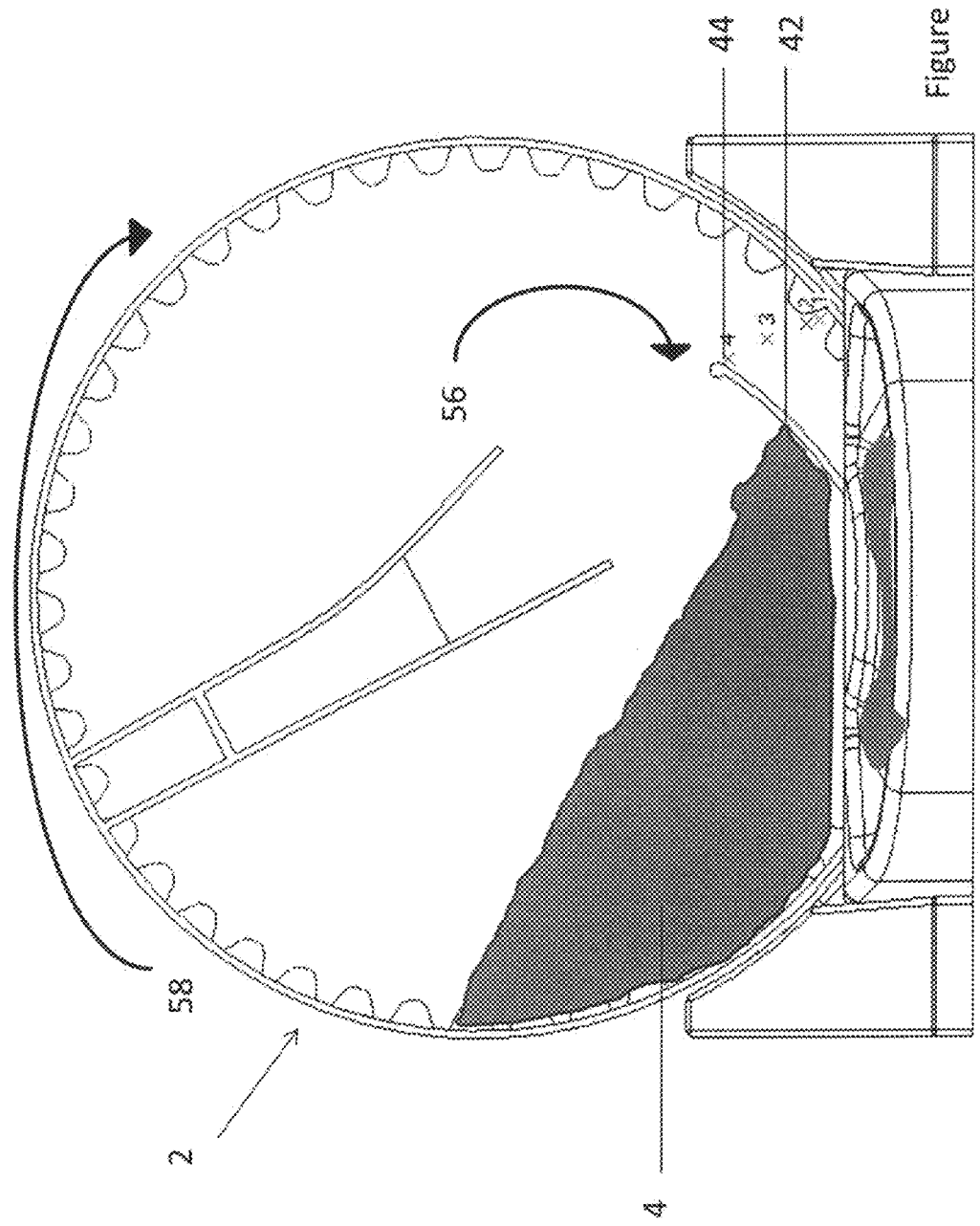

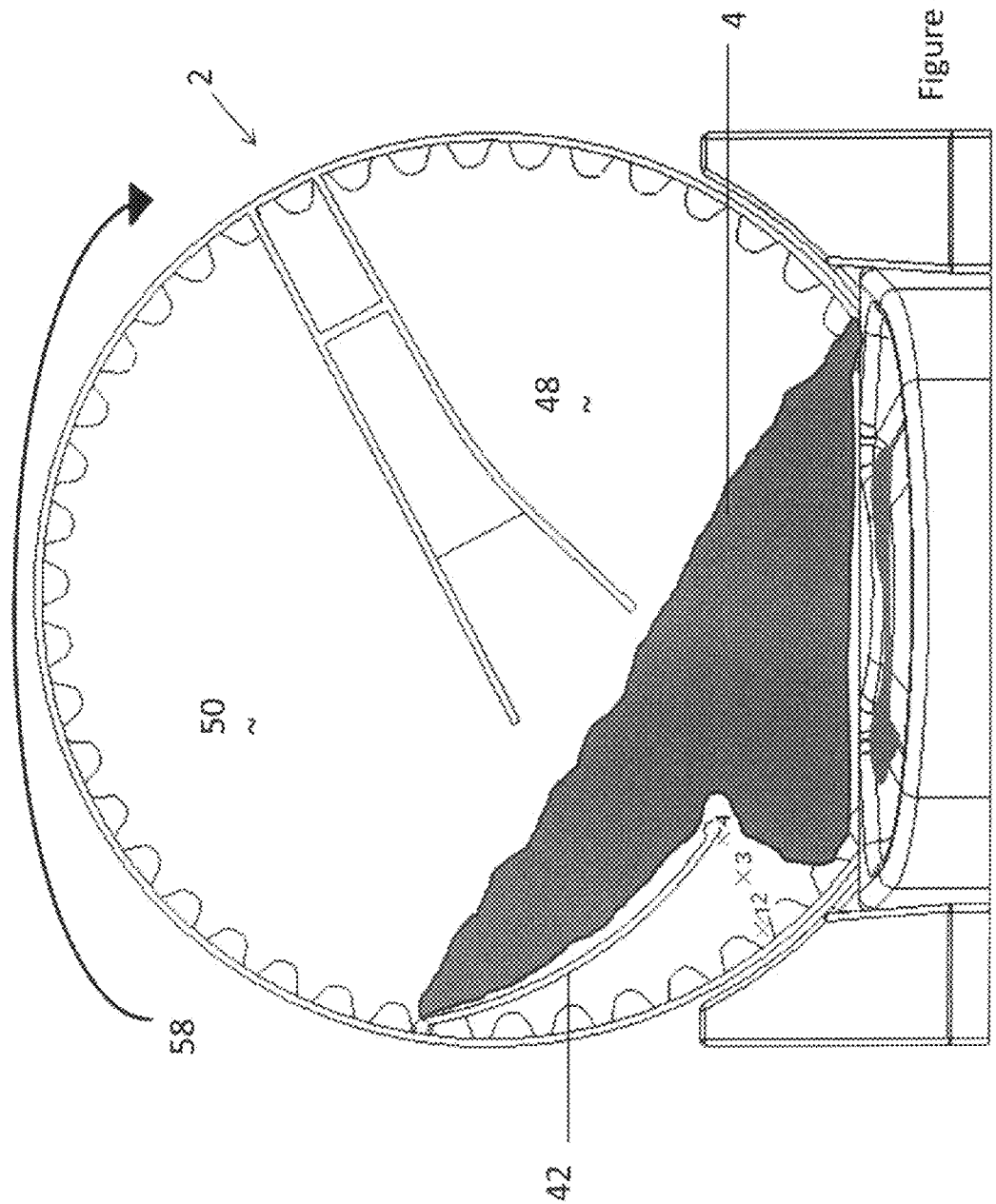

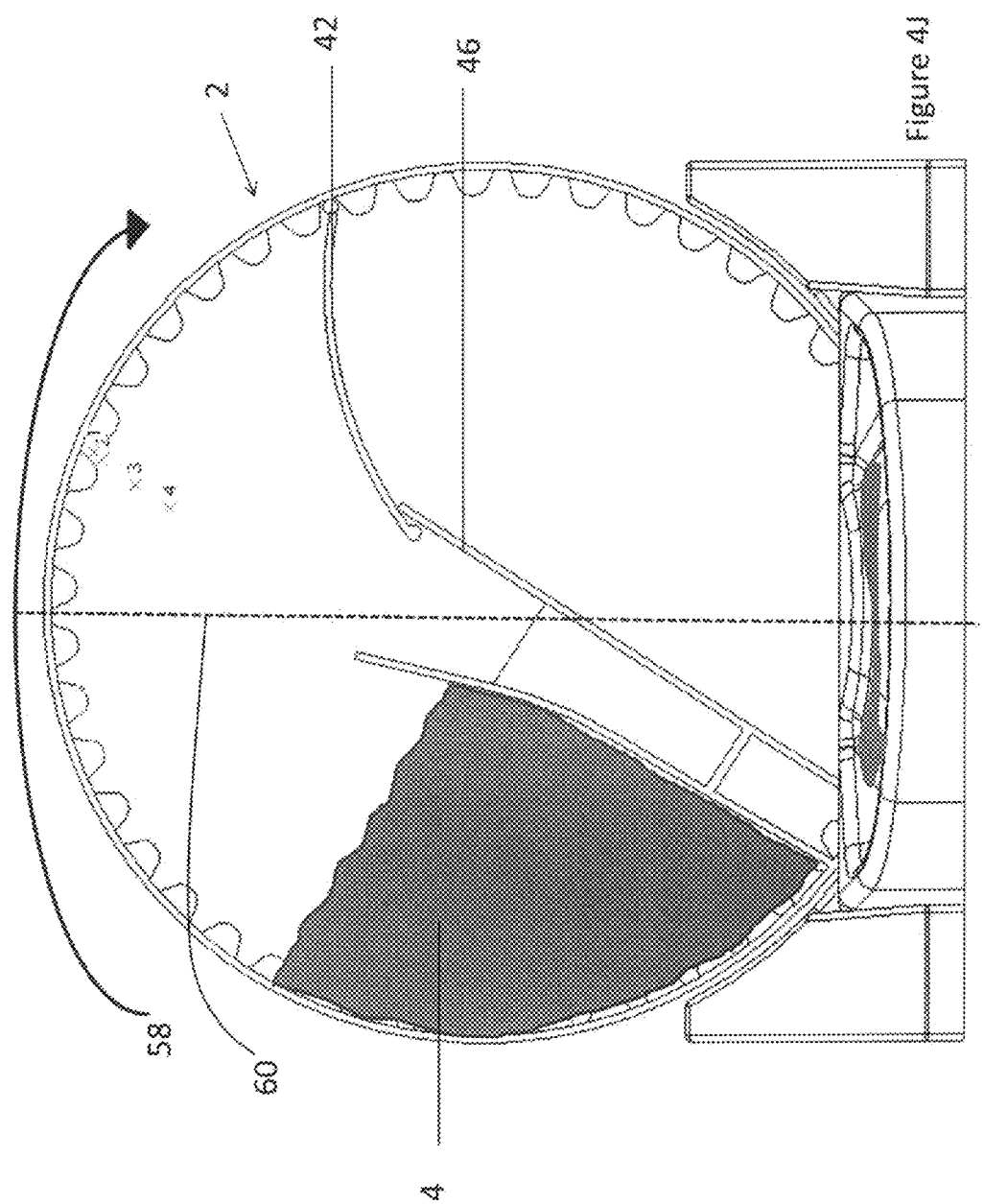

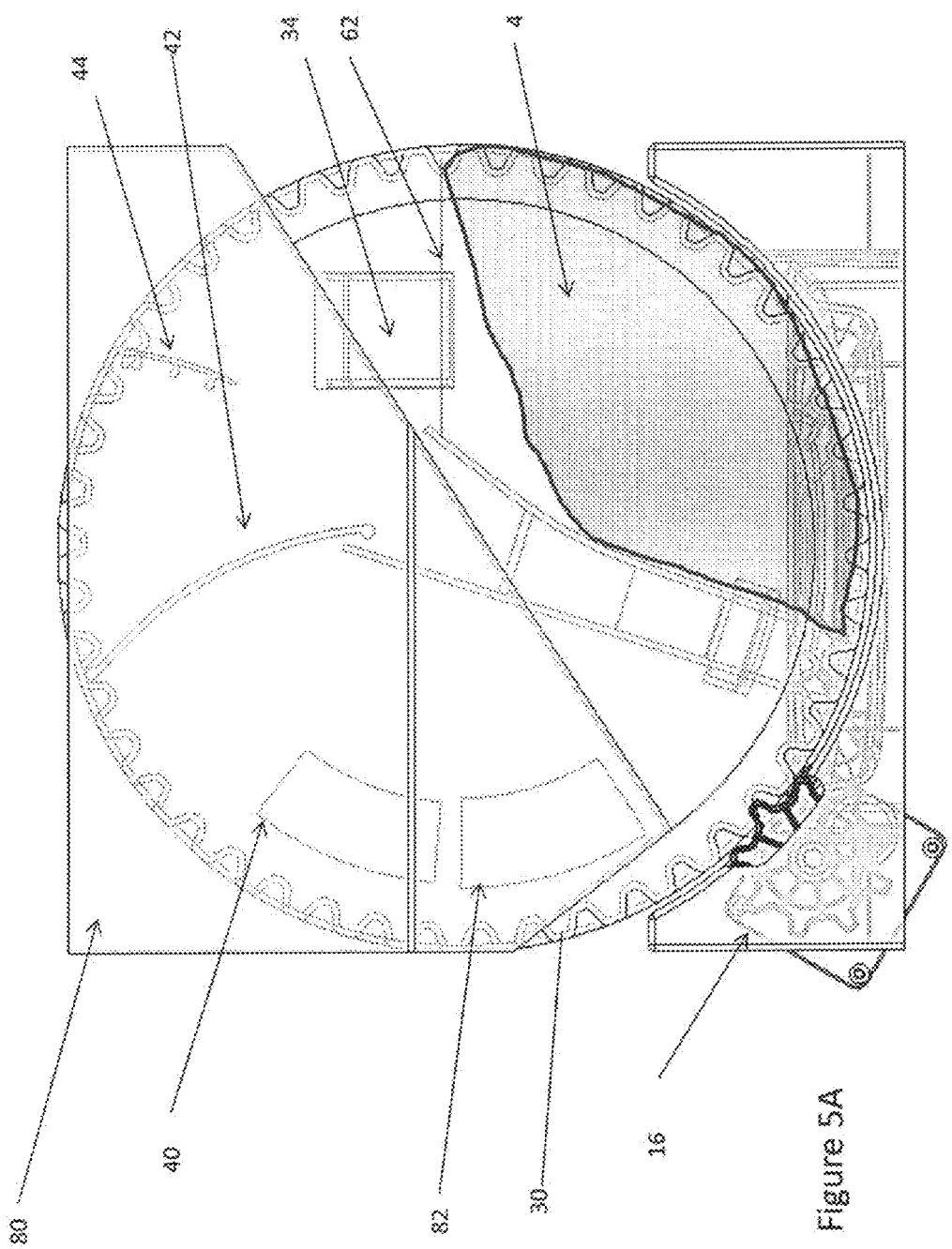

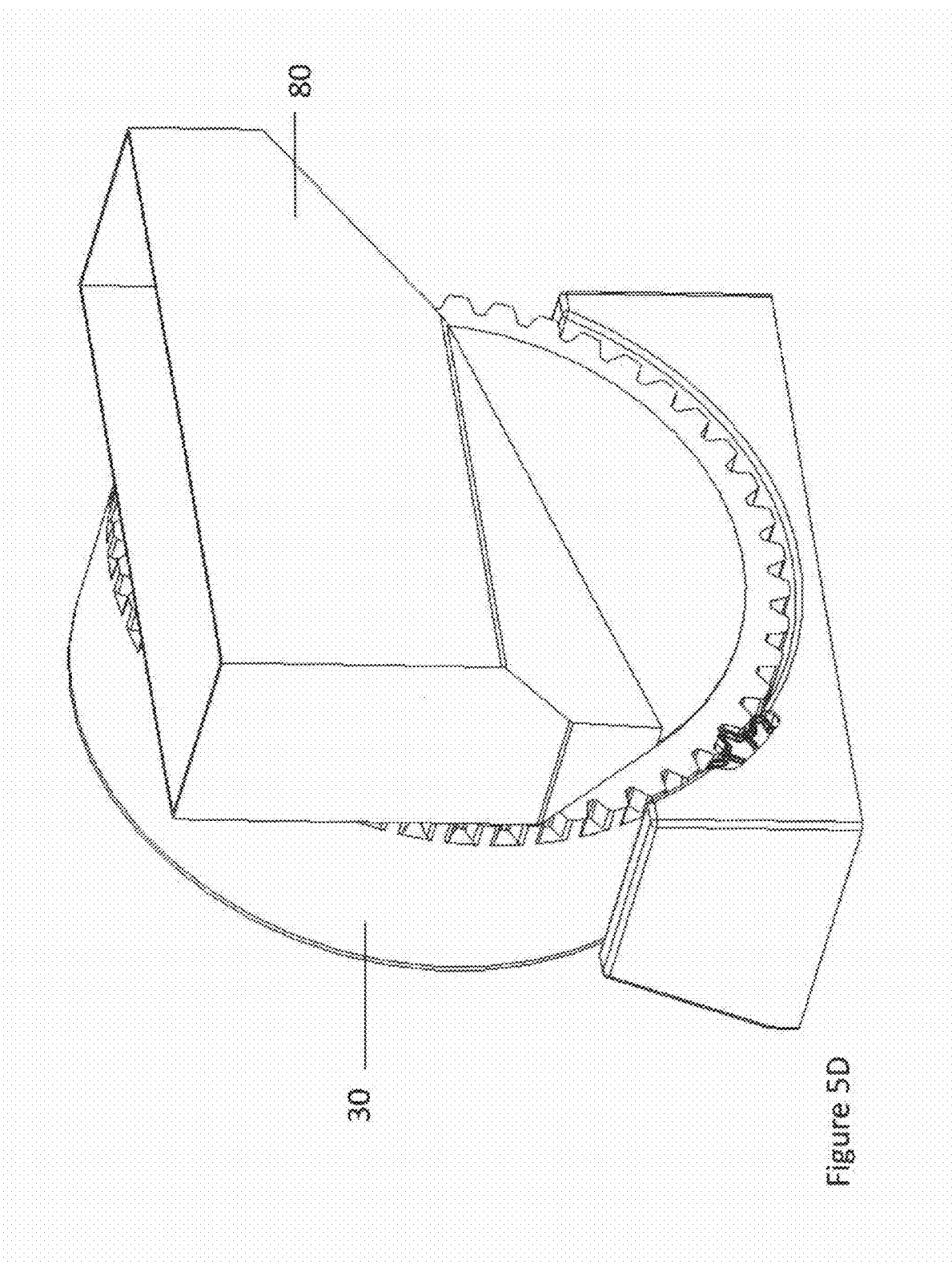

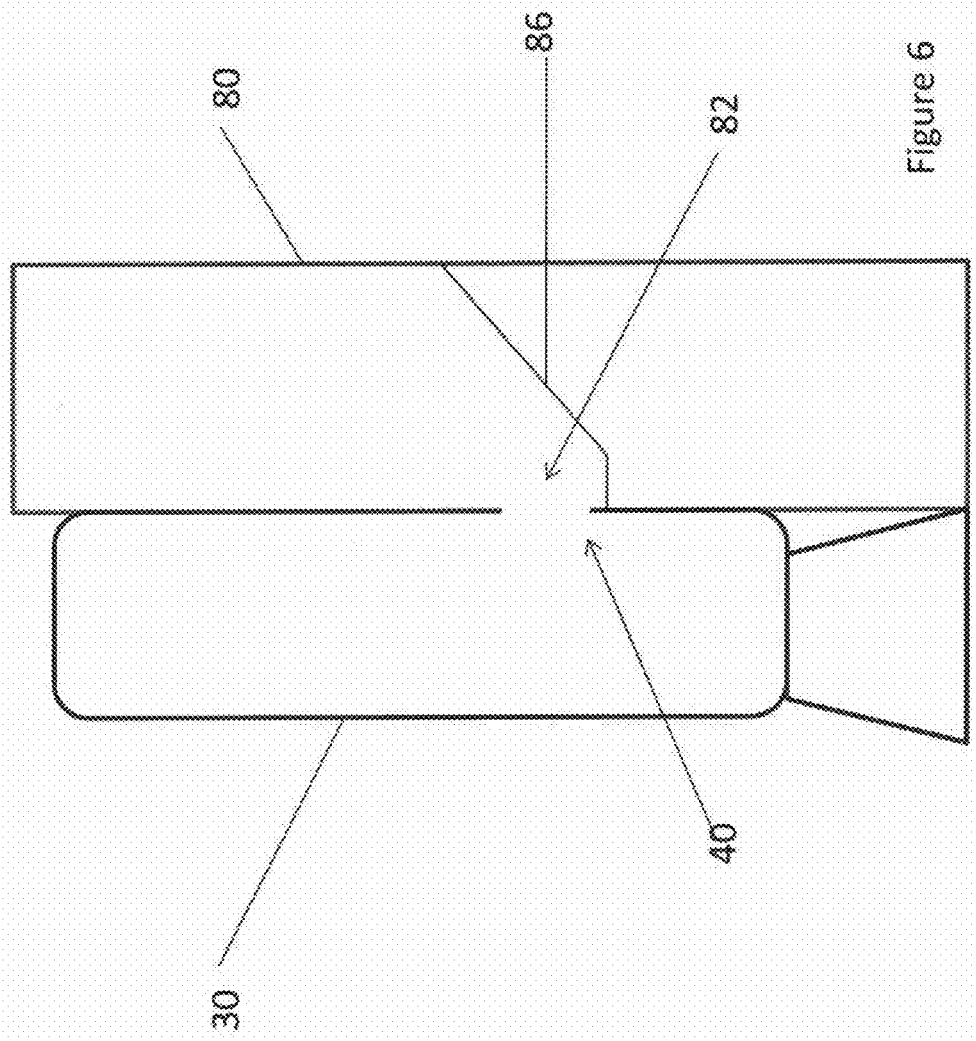

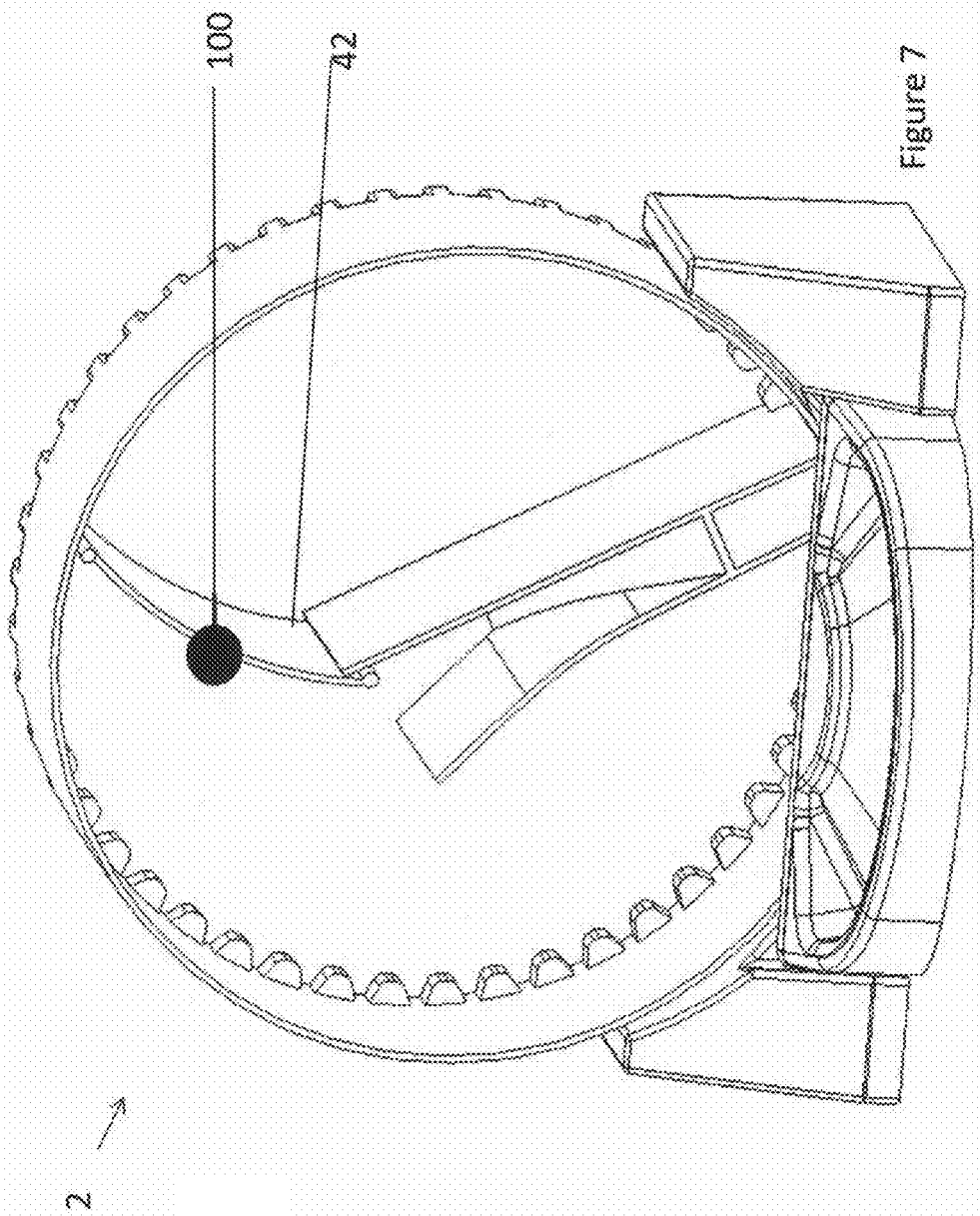

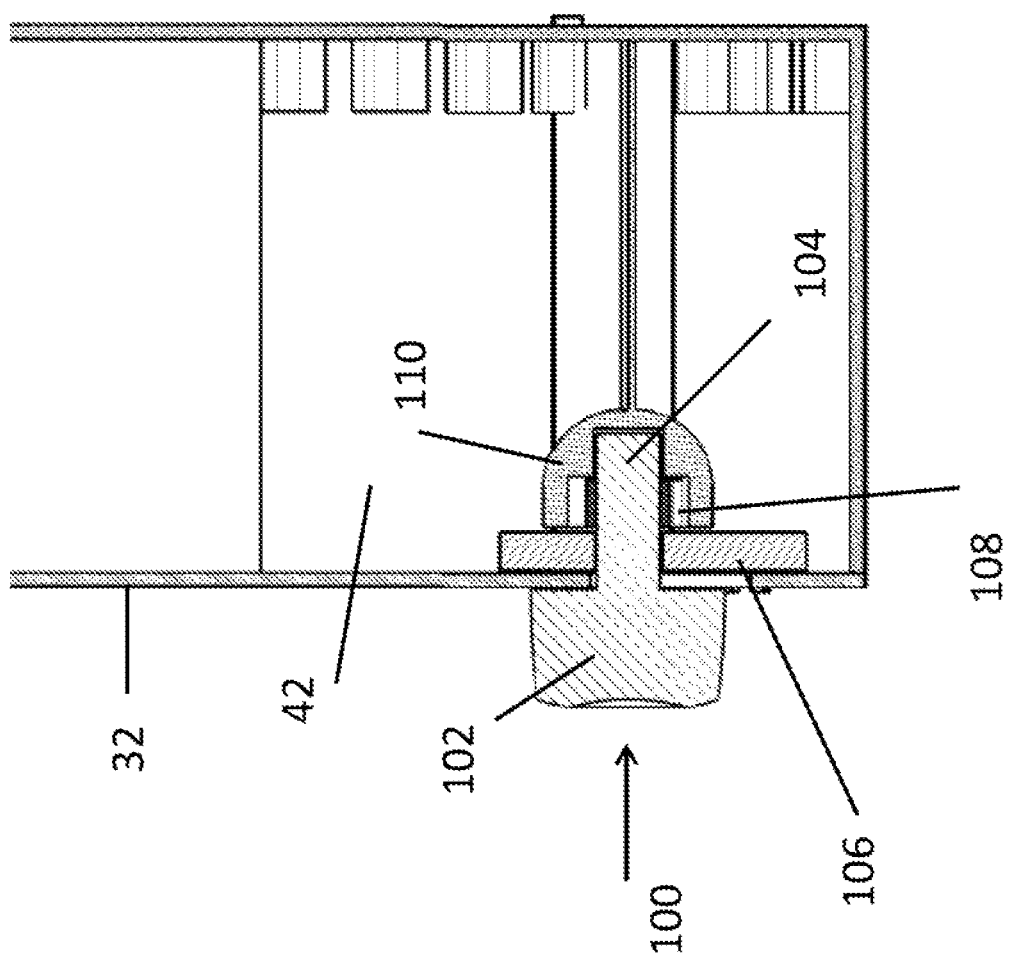

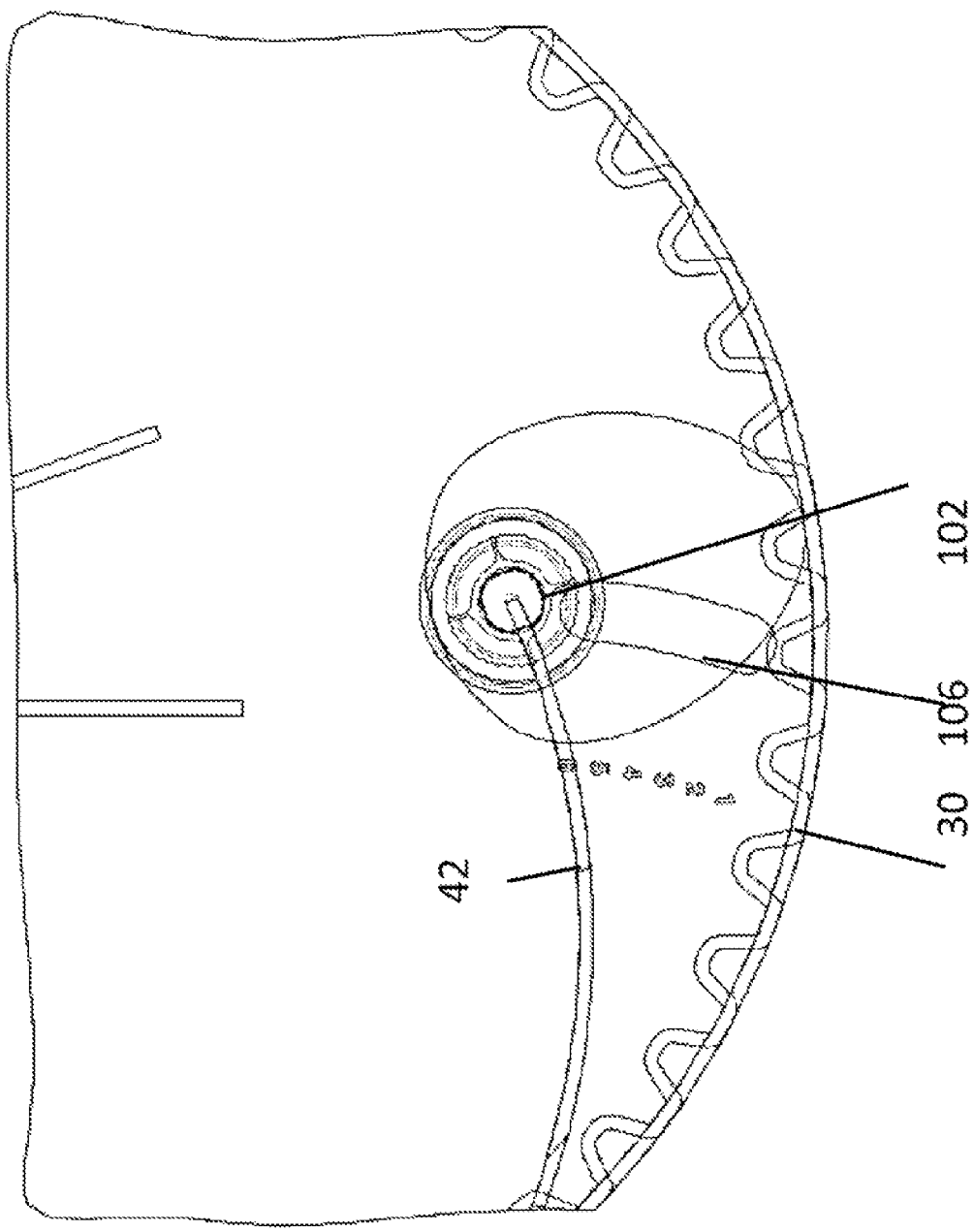

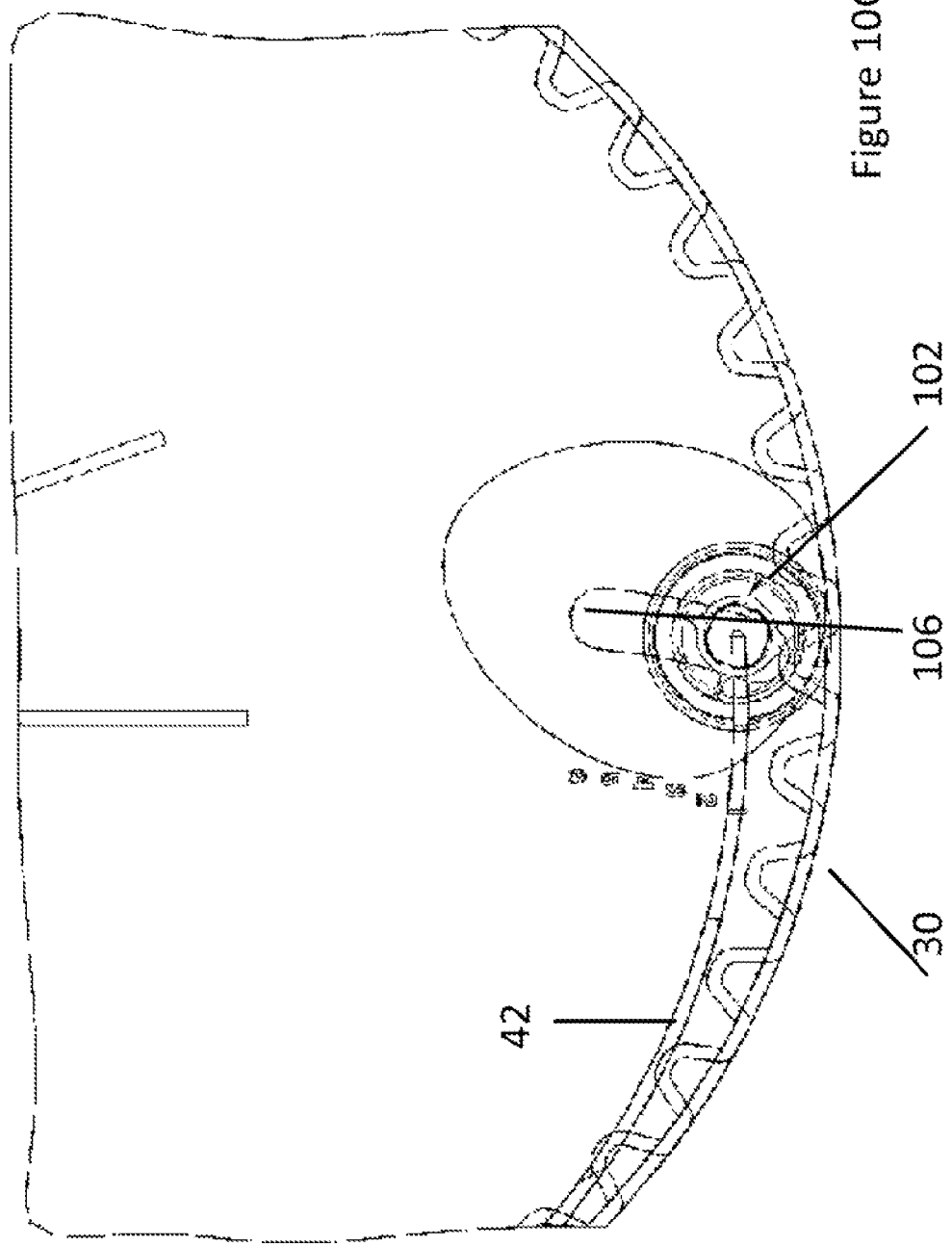

AUTOMATED FEEDING DEVICE AND METHOD

FIELD

The present teachings generally relate to an improved feeding device that automatically dispenses a predetermined and consistent amount of food on a predetermined basis.

BACKGROUND

The present teachings are predicated upon providing an improved feeding device, and specifically an improved automatic feeding device. There are numerous different feeder designs available on the market. Many of these designs employ a carousel design that is pre-filled by a user and each day the feeder dispenses and/or makes available the contents of one bin of the carousel until all of the bins are empty and the bins are refilled by the user. The carousel feeders generally have 5 to 7 bins such that one bin is dispensed each day and thus the carousel feeders limited to a five to seven day storage ability without user interaction. Other designs employ an auger, conveyor belt, or similar movement device that operates at a set speed for a set duration to dispense a target amount of food. However, the volume of food dispensed from feeding to feeding may be inconsistent and trial error by the user may be required until a desired volume of food is dispensed. Additionally, changing food type, food size, moisture of the food, of a combination thereof may affect the reliability of these designs, the amount of food dispensed, or both. Many of these designs have increased the number of motors and/or movie parts in an attempt to reliably dispense food; however, the increase in moving parts and motors may increase failures of the devices and/or food becoming lodged within the moving pats so that the device ceases to dispense food, dispenses inconsistent amounts of food, or both.

Examples of some automated feeder designs may be found in U.S. Pat. Nos. 4,000,719; 5,054,657; 5,908,007; 5,957,082; and 7,111,581; U.S. Patent Application No. 2002/0096120; and International Patent Application No. WO2010/065385 all of which are incorporated by reference herein for all purposes.

It would be attractive to have a feeding device that consistently dispenses a constant volume of food regardless of food type, food size, moisture of the food, or a combination thereof. It would be attractive to have a multi-day feeder that limits user interaction. What is needed is an automated feeder with a reduced amount of moving parts that reliably provides a constant amount of food regardless of food size, moisture, or both.

SUMMARY

The present teachings meet one or more of the present needs by providing a device comprising: a feeder comprising a base assembly and a rotatable housing, wherein the rotatable housing comprises: a pivotable portioning divider and an adjustment mechanism for adjusting the position of the pivotable portioning divider so that the pivotable portioning divider can be adjusted to vary an amount of food dispensed by the feeder.

One unique aspect of the present teachings include a method comprising: providing the feeder of the teachings herein, rotating the rotatable housing, and selecting a divider stop position and/or an eccentric divider stop position so that a predetermined volume of food is segregated for dispensing.

The teachings herein surprisingly solve one or more of these problems by providing an automated feeder with a reduced amount of moving parts that reliably provides a constant amount of food. The teachings herein provide a feeding device that consistently dispenses a constant volume of food regardless of food type, food size, moisture of the food, or a combination thereof. The teachings herein provide an elegantly simple solution to a multi-day feeder that limits user interaction while distributing a consistent amount of food.

BRIEF DESCRIPTION OF THE DRAWINGS

FIGS. 4A-4J illustrate views of the feeding device during a dispensing sequence;

FIG. 4B2 illustrates a close-up view of the divider and divider stops illustrated in FIG. 4B1;

FIGS. 4C to 4J illustrate the position of the feeder during rotation for filling and return to the feeding position.

FIG. 5A-6E illustrate a feeding device and associated refill bin;

FIG. 6 illustrates a cross:-sectional view of a feeding device connected to a refill bin;

FIG. 7 illustrates a front perspective view of another possible feeding device;

FIG. 9 illustrates a side view of an eccentric divider stop;

FIGS. 10A-10C illustrates adjustment of the eccentric divider stop;

DETAILED DESCRIPTION

Figure 1:
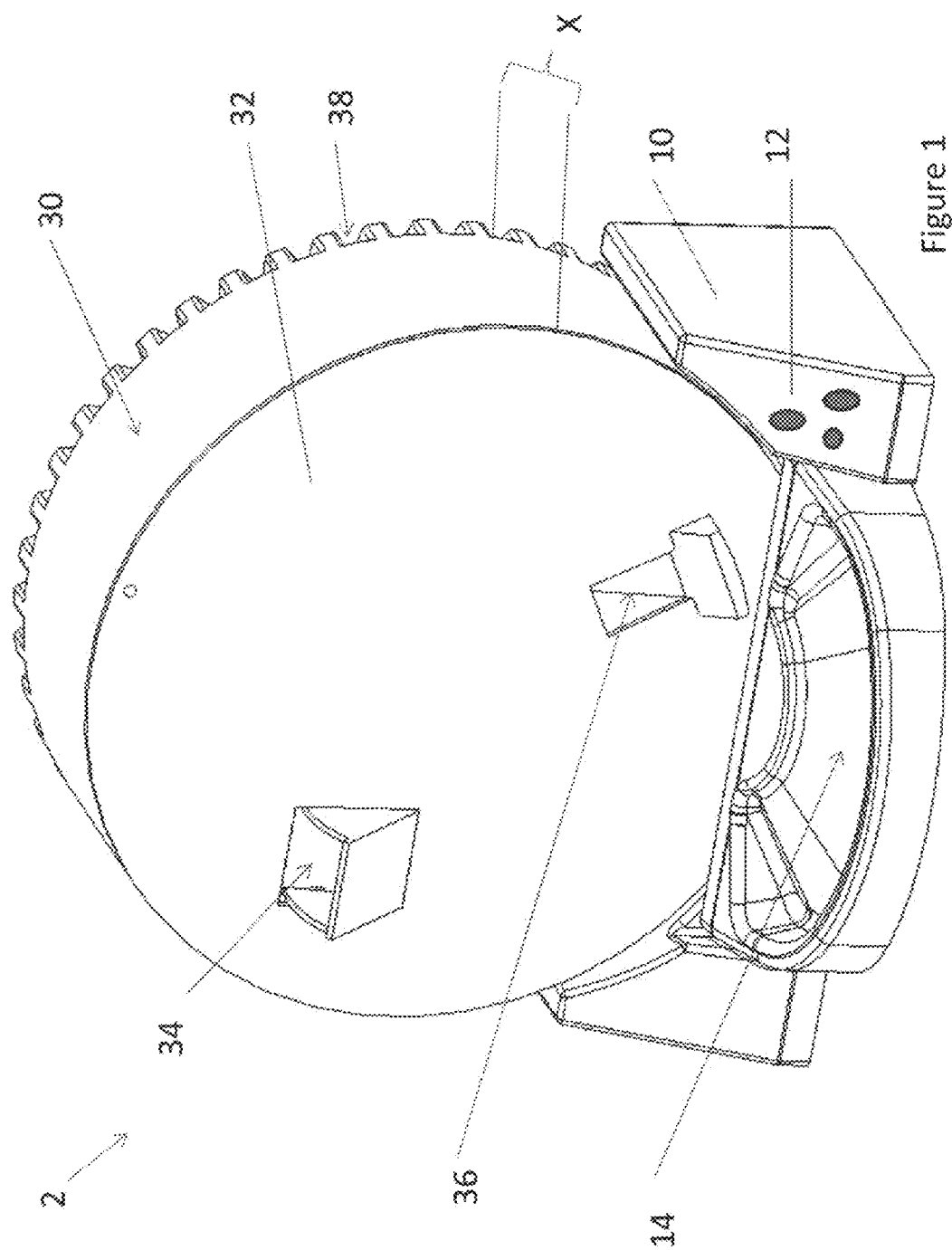
FIG. 1 illustrates a front perspective view of one possible feeding device.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

Other combinations are also possible as will be gleaned from the following claims, which are also hereby incorporated by reference into this written description.

The device may be any device that includes and dispenses food for consumption by an animal. The device may be used by any domesticated animal such as a pig, dog, cat, rabbit, guinea pigs, or a combination thereof. Preferably, the device may be designed for use by a cat.

The device may include one or more of the following features: one or more divider stops, an eccentric divider stop, a multi-length lobe attached to a knob and an axle, a food chute, a weighted pivotable portioning divider, a mass sensor, a refill bin, a transparent rotatable housing, or a combination thereof.

The device includes a base assembly and a rotatable housing. The rotatable housing may be in communication with the base assembly. The base assembly may be any device that supports the rotatable housing, rotates the rotatable housing, or both. The base assembly may rest on a surface, maintain the rotatable housing so that the rotatable housing may dispense food, collect food dispensed from the rotatable housing, or a combination thereof.

The base assembly may house one or more motors. Preferably, the base assembly houses all of the motorized components of the feeder. The base assembly may be substantially planar (i.e., a majority of the base assembly may be located within 1 plane). Preferably, the base assembly is substantially "U" shaped so that the rotatable housing is cradled by the base assembly. The base assembly includes a control panel for controlling operation of the feeder.

The control panel may be any device that controls the functions of the feeder. The control panel may control movement of the rotatable housing. The control panel may control the frequency of dispensing food. The control panel may be located at a location on the base assembly. Preferably, the control panel may be located outside of a central region of the base assembly so that the food may be dispensed within the central region. The control panel may rotate the rotatable housing clockwise, counterclockwise, to a dump position, to a home position, to a fill position, or a combination thereof. The control panel may include a microprocessor, a processor, or both that monitors and/or receives one or variable for use with the device. One or more variables that may be monitored and/or adjusted are an amount of food within the rotatable housing, amount of food within the bowl, days remaining before the device may require refilling, the amount of time between feedings, the size of the food in the device, the moisture of the food within the device, the type of animal being fed, the size of the animal being fed, or a combination thereof. For example, the user may enter the size of the animal and the feeder may increase and/or decrease the volume and/ or frequency of food dispensed to accommodate an animal of that size. Preferably the control panel in communication with a drive gear.

The drive gear may be any device that may be used to dispense food. Preferably, the drive gear may be any device that may be used to rotate the housing. More preferably, the drive gear may matingly be used in conjunction with a trace on the rotatable housing so that the rotatable housing may be rotated by the drive gear. Most preferably, the drive gear may be located between a motor and the rotatable housing and may transfer power from the motor to the rotatable housing so that the rotatable housing rotates. The drive gear may include teeth that mate with a track on the rotatable housing. The drive gear may be any drive mechanism capable of moving, rotating, or both the rotatable housing. The drive gear may include a cog, a sprocket, a belt, a direct drive, or a combination thereof. The drive gear may be made of any material that is resistant to moisture, vapor, fumes, or a combination thereof. The drive gear may be made of any material that is strong enough so that the drive may rotate the rotatable housing. Examples of materials that may be used for the drive gear include rubber, plastic, metal, ceramic, or a combination thereof. The drive gear may be made of the same material as the rotatable housing, the base assembly, or both. The drive gear may be made of a material that may be molded and preferably a material that may be injection molded. More preferably, the drive gear is made of nylon. The drive gear may be made of any material with sufficient strength so that the drive gear may transfer power from a motor to the rotatable chamber without the drive gear, the rotatable cover, or both being damaged.

The motor may be any motor that may rotate the rotatable chamber. The motor may be any motor that may rotate about 2 Kg or more, about 5 Kg or more, about 10 Kg or more, or about 25 Kg or more. The motor may rotate about 100 Kg or less, about 75 Kg or less, or about 50 Kg or less. The motor may be any motor that may fit within the base assembly. The motor may be any motor that may be directly in communication with the rotatable housing, indirectly in communication with the rotatable housing, or both. The motor may be any device that may move the rotatable housing so that food is dispensed from the rotatable housing. Preferably, food is dispensed from the rotatable housing into a bowl.

The bowl may be a separate piece, an integral piece, removable, or a combination thereof. The bowl may be part of the rotatable housing, the base assembly, a discrete member, or a combination thereof. The bowl may be any device that may receive food as the food is dispensed from the rotatable housing. Preferably, the bowl may be any device that may receive about ½ cup of food or more, about 1 cup of food or more, about 1.5 cups of food or more, about 2 cups of food or more, or even about 3 cups of food or more. The bowl may be any device that may receive about 5 cups of food or less, about 4.5 cups of food or less, or about 4 cups of food or less. The bowl may be located proximate to the base assembly. Preferably, the bowl is attached to the base assembly. The bowl may include a weight sensor that may monitor the weight in the bowl so that a feed cycle may be triggered when the weight of food in the bowl goes below a predetermined amount.

The weight sensor may be any type of sensor that monitors the mass in the bowl, the mass of the bowl and its contents, the mass of the dispenser, the mass of the food bid, the mass of the entire assembly, or both. The weight sensor may be any type of sensor that may monitor the amount of food dispensed so that additional food may be dispensed when the food begins to run low. The weight sensor may be a capacitance sensor, a direct weight sensor, an indirect weight sensor, an infrared proximity sensor, a vision sensor (e.g., a beam), or a combination thereof. Additional aspects of the weight sensor can be gleaned from the teachings herein including those of FIG. 14 and paragraph nos. 0035-0038 and 0084 of provisional application Ser. No. 61/661,078, filed on Jun. 18, 2012; and paragraphs 0036-0041 and 0087; and FIG. 15 of application Ser. No. 13/804,370, filed on Mar. 14, 2013 all of which are incorporated by reference herein for teachings regarding a weight sensor (i.e., a foot, rocker arm, compressible contact member, expandable and/or compressible member, force sensitive monitoring device, or a combination thereof) that may be used with the teachings herein. The weight sensor may continually, intermittently, or both monitor the mass in the bowl.

The weight sensor may be located at any location in the device so that any change in mass in the bowl is measured. The predetermined mass may be any mass that triggers a feeding cycle.

The predetermined mass may be about 1 Kg or less, preferably about 0.5 Kg or less, more preferably about 0.25 Kg or less, or even more preferably about 0.1 Kg or less. The teachings of the weight sensor may be used in conjunction with the rotatable housing so that once a predetermined weight of food is removed from the rotatable housing, the rotatable housing may be refilled by a refill bin, may trigger a message to an owner, may prevent the unit for performing a refill cycle, or a combination thereof. The weight sensor may be in communication with the control panel, a microprocessor, a controller, or a combination thereof.

The dispenser, a control panel, a microprocessor, a controller, or a combination thereof may be connected to a phone system, the internet, a website, may have a wireless connection, or a combination thereof so that the dispenser may provide a warning signal to an owner. The weight sensor may provide a warning signal to an owner when the contents of the dispenser become low. For example, the weight sensor, the controller, the microprocessor, or a combination thereof may be connected to the internet or a telephone system and may send a message to a user indicating that the food level is low. The warning signal may be any type of signal that alerts an owner to monitor the status of the dispenser. The signal may be a telephone call, a text, an email, a pre-recorded voicemail, or a combination thereof. The dispenser may be connected to a website and the website may provide a warning to a user.

The website may monitor the frequency that the dispenser dispenses so that a user may track the amount of food an animal consumes. The dispenser may include a data port so that a user may manually download feeding information. The dispenser may include unique identifier tags that may be placed on an animal and when an animal with the unique tag comes into the proximity of the dispenser, the dispenser dispenses food for that animal. The dispenser may not dispense food when other animals with other tags are proximate to the device. The unique tags may transmit a radio frequency. The rotatable housing may rotate and dispense food when the animal with a unique identifier tag is proximate to the dispenser and may be free of rotation when other unique tags are proximate to the dispenser. The rotatable housing may dispense based upon weight and the dispenser may include one or more lidded dishes that may open when an animal with a unique tag is proximate to the bowls.

The rotatable housing may be any device that holds animal and assists in dispensing food to feed an animal. The rotatable housing may be any size and shape so that the rotatable housing holds a multi-day supply of food and assists in dispensing food. The rotatable housing may hold 3 days of food or more, 5 days of food or more, preferably 7 days of food or more preferably, 10 days of food or more, or even more preferably 15 days of food or more. The rotatable housing may hold 100 days of food or less, 75 days of food or less, or 50 days of food or less. The rotatable housing may hold 3 Kg of food or more, 5 Kg of food or more, preferably 8 Kg or food or more, or more preferably 10 Kg of food or more. The rotatable housing may hold 50 Kg of food or less, 40 Kg of food or less, or 30 Kg of food or less. The rotatable housing may be any shape so that the rotatable housing is rotated by the base assembly. The rotatable housing may be circular, cylindrical, conical, round, a globe, spherical, football shaped, oval, or a combination thereof. The rotatable housing may have a largest dimension of about 20 cm or more, about 30 cm or more, or about 35 cm or more. The rotatable housing may have a largest dimension of about 100 cm or less, about 75 cm or less, or about 50 cm or less. The largest dimension may be a length, a width, a height, a diameter, or a cross direction, or a combination thereof. Preferably, the largest dimension is a diameter.

The rotatable housing may have a planar front wall, a planar rear wall, or both. The rotatable housing may be shaped so that the rotatable housing may be circumscribed, surrounded, bordered, or a combination thereof by a track.

The rotatable housing may include a sufficient amount of track so that the track may rotate the rotatable housing so that feed is dispensed from the rotatable housing. The track may be any device that may assist in rotating the rotatable housing. The track may any device that works in conjunction with one or more components of the base assembly. The track may be rotated by a drive gear. The track and the drive gear may be directly in communication, indirectly in communication, or both. The track preferably is configured so that the track and the drive gear form a mating relationship so that the rotatable housing is rotated.

The rotatable housing may include one or more rotatable housing covers so that the food is retained within the rotatable housing and so that food may be dispensed from the rotatable housing. The rotatable housing covers may be substantially parallel. The rotatable housing covers may be located a distance apart. The distance may be any distance so that a sufficient amount of food may be located within the rotatable housing so that food may be dispensed for the duration discussed herein. The distance between the rotatable housing covers may be about 5 cm or more, about 8 cm or more, preferably about 10 cm or more, or more preferably about 12 cm or more. The distance between the rotatable housing covers may be about 30 cm or less or about 25 cm or less. The rotatable housing covers may include one or more ports. The one or more ports may be any port that may be used to dispense food, fill the rotatable housing, or both. The one or more ports may be located at any location so that the food may be dispensed, the rotatable housing may be refilled, or both. The one or more ports may preferably be a food chute, a fill door, an automatic fill chute door, or a combination thereof.

The rotatable housing cover may include one or more indicators so that a user may know the volume created between the pivotable portioning divider and the divider stops, the volume within the rotatable member, the volume created by the divider stop, or a combination thereof. The rotatable housing cover may include one or more slots. The one or more slots may be an absence of material were a portion of the eccentric divider stop, the one or more divider stops or both extend out of the rotatable housing cover so that an owner can adjust the volume of food segregated. The slot may be any size and shape so that as the pivotable portioning divider, the eccentric divider stops, the one or more divider stops, or a combination thereof move the slot may accommodate the movement. One or more indicator ones may be located proximate to the one or more slots so that an owner may gage the amount of food that will be dispensed. The rotatable housing cover may assist in indicating a level so that as the fill door is used the level in the rotatable housing may be visible. A portion of the rotatable housing, rotatable housing cover, or both may be transparent. Preferably, the entire rotatable housing cover may be transparent so that the contents of the rotatable housing may be visible, so that the mechanical movement of the device may be visible, the level of feed in the rotatable housing may be visible, or a combination thereof.

The inside of the rotatable housing may include a food chute. The food chute may be any device that funnels food from the pivotable portioning divider through the opening in the rotatable housing cover so that food fills a bowl. The food chute may be of sufficient shape and size so that food of virtually any size may be funneled through the food chute and out of the food chute opening. The food chute opening may be larger proximate to the pivotable portioning divider and smaller proximate to the food chute opening. The food chute may be substantially the same size along its length and width. The food chute may include a mouth so that substantially all of the food may be transferred from the pivotable portioning divider into a body of the food chute and directed out of the food chute opening. The food chute may be two substantially parallel portions that may abut one or more rotatable housing cover of the rotatable sing so that food is directed between the two substantially parallel portions and out of the food chute opening. The food chute may be located within the rotatable housing so that the food chute may be contacted by a pivotable portioning divider and the food chute opening simultaneously.

The pivotable portioning divider may be any device that may move and segregate a portion of food from the food contained within the rotatable portion. The pivotable portioning divider may be any size and shape so that the pivotable portioning divider may segregate a predetermined amount of food as discussed herein. The pivotable portioning divider may be used to form a volume between the rotatable housing and the pivotable portioning divider so that a constant volume of food is divided from the total contents of food in the rotatable housing. The pivotable portioning divider may be weighted so that the pivotable portioning divider moves with gravity, hangs in the direction of gravity, or both. The weight of the pivotable portioning divider may move the pivotable portioning divider as the rotatable housing rotates until the pivotable portioning device contacts one or more divider stops, the eccentric divider stop, the food chute, or a combination thereof. The weight of the pivotable portioning divider may assist in maintaining the pivotable portioning divider in contact with the divider stops, the eccentric divider stop, the food chute, or a combination thereof. During operation food may pass over the pivotable portioning divider so that the food assists in maintaining a constant volume between the pivotable portioning divider and the rotatable member. The pivotable portioning divider may be a solid piece of material that may form a volume for dividing a predetermined amount of food so that the food may be dispensed. The pivotable portioning divider may be a flexible piece of material, a rigid piece of material, a hinged piece of material, or a combination thereof. The pivotable portioning divider may move up and down, left to right, or both. Preferably, the pivotable portioning divider may rotate around an axis as the rotatable housing rotates during a feeding cycle. The axis may be located anywhere along the length of the pivotable portioning divider. Preferably, the axis of rotation is located at an end of the pivotable portioning divider located proximate to the rotatable housing so that the pivotable portioning divider moves into contact with a divider stop and forms a volume between the rotatable housing and the pivotable portioning divider.

The one of more divider stops may be located at any location within and/or along the rotatable housing so that the pivotable portioning divider rotates into contact with a divider stop and forms a volume. The one or more divider stops may include one or more rigid parts that form a contact surface that prevents the pivotable portioning divider from rotating beyond a predetermined point. The divider stops may be any device that assists in forming a predetermined volume between one or more walls of the rotatable housing and the pivotable portioning divider. The divider stops may be movable, fixed, or a combination thereof. The divider stops may be at one or more predetermined locations. The divider stops may be extendable, retractable, static, movable, or a combination thereof. For example, a divider stop may include one or more holes in the one or more rotatable housing covers and a movable member that may be moved from hole to hole so that a volume may be selected. In another example, the divider stop may include one retaining path in the one or more rotatable housing covers and a movable member that may slide along the path so that a volume may be selected.

In yet another example, the divider stops may be permanent and a user may press on one or more of the divider stops so that all or a portion of the divider stops extend into the rotatable housing so that the pivotable portioning divider contacts the divider stop during rotation. In yet another example, the divider stops may be extendable from an edge (i.e., the circumference) of the rotatable housing so that the pivotable portioning divider contacts the divider stop to create a predetermined volume. The divider stops may be an eccentric divider stop.

The eccentric divider stop may be any device that may be used to select a volume of food that may be segregated by the pivotable portioning divider. The eccentric divider stop may include one or more parts that assist in selecting a volume of food that may be segregated by the pivotable portioning divider. The eccentric divider stop may be used in addition to the one or more divider stops. Preferably, however, either the eccentric divider stop or the one or more divider stops are used to select the volume of food segregated by the pivotable portioning divider. The eccentric divider stop may be connected to any moving part of the feeder.

Preferably, the eccentric divider stop is connected to the pivotable portioning divider. The eccentric divider stop may contact any part of the feeder so that a volume is formed for segregating a predetermined amount of food. Preferably, the eccentric divider stop contacts the rotatable housing, a projection on a rotatable housing cover, or both. All or a portion of the eccentric divider stop may extend through the rotatable housing, the rotatable housing cover, or both so that the volume may be adjusted by an owner. The eccentric divider stop may include a knob, an axle, a lobe, a ratchet interface, a divider pocket in a pivotable portioning divider, or a combination thereof.

The knob may be any part of the eccentric divider stop that assists a user in adjusting a volume of food segregated. The knob may be located at any location on the eccentric divider stop so that a user may adjust a volume of food segregated. Preferably, the knob is located on the outside of the rotatable housing. More preferably, the knob extends out of the rotatable housing cover so that the knob may be used to adjust the eccentric divider stop.

The knob may assist the user in rotating all or a portion of the eccentric divider stop so that the volume created by the pivotable portioning divider may be varied. The knob may be any shape and size so that a user may rotate the knob and the eccentric divider stop. Preferably, the knob is connected to an axle.

The axle may be any device that that extends along an axis and connects one or more parts of the eccentric divider stop so that the eccentric divider stop may be adjusted.

Preferably, the axle is connected on one end to the pivotable portioning divider and the knob on the opposing end. The axle may extend through the rotatable housing, the rotatable housing cover, or both so that the knob is located on the outside of the feeder. The axle may be any shape and size so that the axle may be used to adjust the eccentric divider stop and the volume of food segregated. The axle may be any device that has sufficient strength so that the axle may be used to adjust the eccentric divider stop. The axle may be made of any material that may be used to adjust the eccentric divider stop. Preferably, the axle is made of metal or a rigid plastic. The axle may be fixedly connected to the pivotable portioning divider via a ratchet interface.

The ratchet interface may be any device that connects the axle to the pivotable portioning divider, assists in connecting the axle to the pivotable portioning divider, or both. The ratchet interface may be any device that is connected to the axle, the pivotable portioning divider, or both and retains the position of the axle after rotation of the axle so that the axle remains substantially static. The ratchet interface may be any device that extends around and/or extends into the axle so that the ratchet interface and the axle form a fixed connection relative to each other. The ratchet interface may be any configuration so that when the axle is rotated by an owner the ratchet interface prevents independent movement of the axle, maintains the position of the axle, locks the axle in place, or a combination thereof. The ratchet interface may maintain the axle so that a sufficient force is required to move the knob, the eccentric divider stop, or both so that the axle is prevented from independently moving. The ratchet interface may require a force of about 1 N or more, about 2 N or more, about 3 N or more, or even about 4 N or more to rotate the axle. The ratchet interface may require a force of about 20 N or less, about 15 N or less or about 12 N or less to rotate the axle. The ratchet interface may include one or more features that assist in maintaining the position of the axle, creating a force to rotate the axle, or both. The one or more features may be a gear having one or more teeth and a pawl that engages the one or more teeth. The pawl may extend over the teeth as the axle is rotated and then lock against the teeth so that additional rotation of the axle is prevented. The ratchet interface may be located inside of the pivotable portioning divider. The ratchet interface may extend out from the pivotable portioning divider. The ratchet interface may be located on and/or in any location along the pivotable portioning divider. Preferably, the ratchet interface is located in a divider pocket and/or proximate to the pivotable portioning divider pocket.

The pivotable portioning divider pocket may be any feature of the pivotable portioning divider that accommodates all or a portion of the eccentric divider stop. The pivotable portioning divider may be a step, an absence of material, an indentation, a cut out, or a combination thereof in the pivotable portioning divider. The pivotable portioning divider pocket may accommodate the ratchet interface, the lobe, the axle, or a combination thereof. The pivotable portioning divider pocket preferably is located on a edge of the pivotable portioning divider so that the axle extends out of the feeder so that an owner can adjust the eccentric divider stop. The pivotable portioning divider pocket may be any size and shape so that the pivotable portioning divider pocket accommodates the lobe so that the lobe may rotate around the axle to determine the volume of food that is segregated.

The lobe may be any device that assists in adjusting a volume created by the pivotable portioning divider. The lobe may be any device that determines the volume created by the pivotable portioning divider. The lobe may be any size and shape that assists in varying the volume created by the pivotable portioning divider. The lobe may be any shape and include an eccentric connection. For example, the lobe may be oblong in shape (e.g., oval, rectangular, elliptical) and the lobe may be connected to the axle on one end so that depending on the position of the lobe the volume created by the pivotable portioning divider is varied. The lobe may be circular and include an eccentric connection. The lobe may be positioned along any location of the lobe so that as the lobe position changes a contact point of the lobe on the rotatable housing varies and the length of the pivotable portioning divider from the rotatable housing varies. The length of the pivotable portioning divider from the rotatable housing may vary the volume of food segregated by the pivotable portioning divider. The lobe may be rotated 180 degrees and as the lobe is rotated along 180 degrees the volume formed by the pivotable portioning divider may be varied. The lobe may be rotated 360 degrees, however, each 180 degree half may create a length that corresponds to a length on the opposing 180 degree half. The lobe is an eccentric device so that the lobe may be used to vary the volume created by the pivotable portioning divider. For example, the pivotable portioning divider is supported by an axle connected to the lobe and when the lobe contacts the rotatable housing the lobe and axle prevent further movement of the pivotable portioning divider so that a volume is created between the rotatable housing the pivotable portioning divider. The lobe may be used to create a length that varies from about 1 mm to about 50 mm, from about 2 mm to about 25 mm, or about 3 mm to about 15 mm. During rotation a predetermined volume of food is segregated and retained within the volume created by the divider stops and/or the eccentric divider stop and the pivotable portioning divider, and the remaining food is passed over the pivotable portioning divider.

During rotation food passes from a storage portion of the rotatable housing to a divider storage portion of the rotatable housing. The storage portion and the divider storage portion may segregated by the food chute, the pivotable portioning divider, or both. The storage portion may be on a first side of the food chute and the divider storage portion may be on a second side of food chute. Preferably, in operation, all or a majority of the food begins in the food storage portion and as the rotatable housing is rotated the food transfers from the food storage portion to the divider storage portion while a predetermined amount of food is segregated by the pivotable portioning divider so that the predetermined volume of food may be dispensed. After the food is dispensed the rotatable housing rotates in an opposing direction so that the remaining food (i.e., non-dispensed food) is transferred from the divider storage portion to the storage portion so that the device is prepared for subsequent operation. A fill chute door, an automatic fill chute door, or both may be located at any location on the feeder so that additional feed may be placed in the feeder. A fill chute door, automatic fill chute door, or both may be located either side of the food chute (e.g., the storage portion, the divider storage portion, or both). Preferably, a fill chute door is located on the storage portion side of the food chute so that the rotatable housing is not overfilled. Preferably, the automatic fill chute door is located on the divider storage portion side. The storage portion, the divider storage portion, or both rosy include a fill line so that an owner does not overfill the rotatable housing. A fill chute door, an automatic fill chute door, or both may be located on a front housing cover, a rear housing cover, the rotatable housing, a cylindrical edge, or a combination thereof.

The fill chute door, the automatic fill chute door, or both may be used to refill the rotatable housing. The fill chute door, the automatic fill chute door, or both may be located on any position of the feeder so that food may be transferred from the refill bin to the feeder and so that when the feeder (i.e., rotatable housing) is full, additional food is prevented from entering the feeder. For example, when the automatic fill chute door and the refill bin chute door are aligned food will move from the refill bin to the rotatable housing until the automatic fill chute door is covered. The refill bin may be aligned with the rotatable housing so that the refill bin blocks the fill chute door, the automatic fill chute door, or both when the refill bin chute door and the chute door and/or automatic fill chute door are not aligned so that food is prevented from exiting the rotatable housing during rotation, at a home position, at a dispensing position, or a combination thereof. The refill bin may be any device that may be used to automatically refill the rotatable housing. The refill bin may be any size and shape so that food may be transferred from the refill bin to the feeder. The refill bin may be attached to a portion of the device, may be separate from the device, may be movably attached to the device, or a combination thereof. Preferably, the refill bin is a removably attachable piece that remains static as the rotatable housing rotates. The refill bin, the automatic fill chute door, or both may include an attachment feature that may movably attach the refill bin to the rotatable housing so that as the rotatable housing rotates to the home position, an automatic fill position, or both food may be transported from the refill bin to the rotatable housing. The attachment feature may disconnect the refill bin from the rotatable housing, may allow the rotatable housing to rotate around and axis while the refill bin remains static.

The attachment feature may be a connection through the axis of the rotatable housing that connects the refill bin. The attachment feature may extend around an internal circumference of the refill bin. The attachment feature may be a brush seal around the circumference, a pin through the axis of rotation of the rotatable housing and the refill bin, a bearing surface around the circumference of the rotatable housing, a groove around the circumference of the rotatable housing, or a combination thereof. The refill bin may include a refill bin stop. The refill bin stop may be any feature that covers the automatic fill chute door during rotation so that food cannot exit the rotatable housing. The refill bin stop may be an extension of the refill bin so that substantially the entire surface area of a side of the rotatable housing is covered. The refill bin may include a transfer feature.

The transfer feature may be any device that assists in moving food from the refill bin to the feeder. The transfer feature may be a slope in the refill bin so that food is gravity fed into the feeder. The transfer feature may be a spring loaded tab that may move to loosen and/or encourage flow when the opening in the feeder and the opening in the refill bin are aligned so that food is transferred. The transfer feature may be a belt, a screw, a mechanical device that moves food, or a combination thereof. The refill bin may be any size and shape so that the refill bin houses a sufficient amount of food to extend food distribution of the device. The refill bin may hold 10 Kg of food or more 15 Kg or more, or even 20 Kg or more (i.e., at 50 pound bag of food). The refill bin may hold 10 days of food or more, 15 days of food or more, or even 20 days of food or more. The refill bin may hold 6 months of food or less, 4 months of food or less, or 3 months of food or less.

The refill bin, the rotatable housing, the base assembly, or a combination thereof may be made of any material that may assist in maintaining the freshness of the food, does not leach chemicals into the food, is dishwasher safe, is resistant to being dropped from a height of 6 feet or less, may be used in a molding process, may be used in an injection molding process, or a combination thereof. The refill bin, the rotatable housing, the base assembly, or a combination thereof may be made of any material that is sufficiently strong to store multiple days of food, be rotated, or both. The refill bin, the rotatable housing, the base assembly, or a combination thereof may be made of a natural material, a synthetic material, a plastic, nylon, a ethylene propylene diene monomer (EPDM), thermoplastic polyurethane, elastomer modified polyolefin, polysiloxanes, santoprene, 2 part urethane, polypropylene, or the like, or a combination thereof.

The device as taught herein may have a method of feeding an animal. The method may include one or more of the following steps performed in any order. The device may be set up so that the rotatable housing is supported by the base assembly. The refill bin may be located proximate to the device so that the rotatable housing may be filled and/or refilled from the refill bin. Food may be transferred from the refill bin to the rotatable housing. The fill door, the automatic fill chute door, or both may be opened so that food may be placed within the rotatable housing. The divider stop may be moved so that a predetermined volume of food may be dispensed. The feeding cycle may be selected. The feeding cycle may be set to rotate when a predetermined amount of food is removed from a bowl located proximate to the device.

The feeding cycle may be set to rotate at a predetermined time. The rotatable housing may be rotated so that food is dispensed from the device. The pivotable portioning divider may be moved into contact with the divider stop so that a predetermined volume is formed between the pivotable portioning divider and the rotatable housing. The pivotable portioning divider may be moved into contact with the food chute so that food is dispensed from the rotatable housing.

The device may be rotated so that food is transferred from the storage portion to the divider storage portion or vice versa.

The device may have a home position. The home position may be the position where the device remains when the rotatable housing is not moving, food is not being dispensed, or both. Preferably, the device is filled and/or refilled while the device is in the home position. The home position may be when the base of the food chute is located proximate to a bowl. The device may rotate clockwise or counter clockwise. The device may rotate in one direction from the home position so that the food is metered and dispensed a feeding (i.e., a feeding cycle) and in the opposing direction from the home position so that all of the food may be removed from the rotatable housing (i.e., a dump cycle). During a feeding cycle the device preferably rotates in a first direction so that a predetermined amount of food is segregated and then after the food is segregated and dispensed the device rotates in the opposing direction so that the food is redistributed from the storage portion to the divider storage portion.

Virtually any type of animal feed may be used with the device taught herein.

Preferably, the device as taught herein is used in conjunction with dry animal feed. The animal food may be any size and shape so that the feed flows within the device. The animal food may be any size so that the animal food does not block the food chute, form a bridge in the rotatable housing the blocks the flow of food, fits through the food door, the automatic fill chute door, or a combination thereof. The animal food may have a largest dimension of about 3 mm or more, 5 mm or more, or even 7 mm or more. The animal food may have a largest dimension of about 3 cm or less, about 2 cm or less, or about 1 cm or less.

FIG. 1 illustrates a feeder 2. The feeder includes a base assembly 10 with a rotatable housing 30 positioned on the base assembly 10. The base assembly 10 has a control panel 12 on one side for controlling the feeder 2 and the drive gear (not shown) so that the drive gear rotates the rotatable housing 30. The base assembly includes a bowl 14 below the rotatable housing 30 so that food (not shown) is dispensed into the bowl 14. The bowl 14 has a weight sensor (not shown) that is in communication with the control panel 12 so that when enough food is removed from the bowl 14 another feeding cycle may be triggered. The rotatable housing 30 includes at least one rotatable housing cover 32 so that the internal components (not shown) can be accessed. The rotatable housing has a thickness (X) that is the distance between the housing cover 32 on the front and the track 38 on the rear. The rotatable housing 30 includes a fill door 34 on the front side so that a user can add food to the rotatable housing 30. The rotatable housing 30 includes a food chute opening 36 on the front side of the rotatable housing 30 that is located proximate to the bowl 14 so that when food is dispensed through the food chute opening 36 the food is dispensed into the bowl 14. The rotatable housing 30 includes a track 38 around its circumference.

Figure 2:
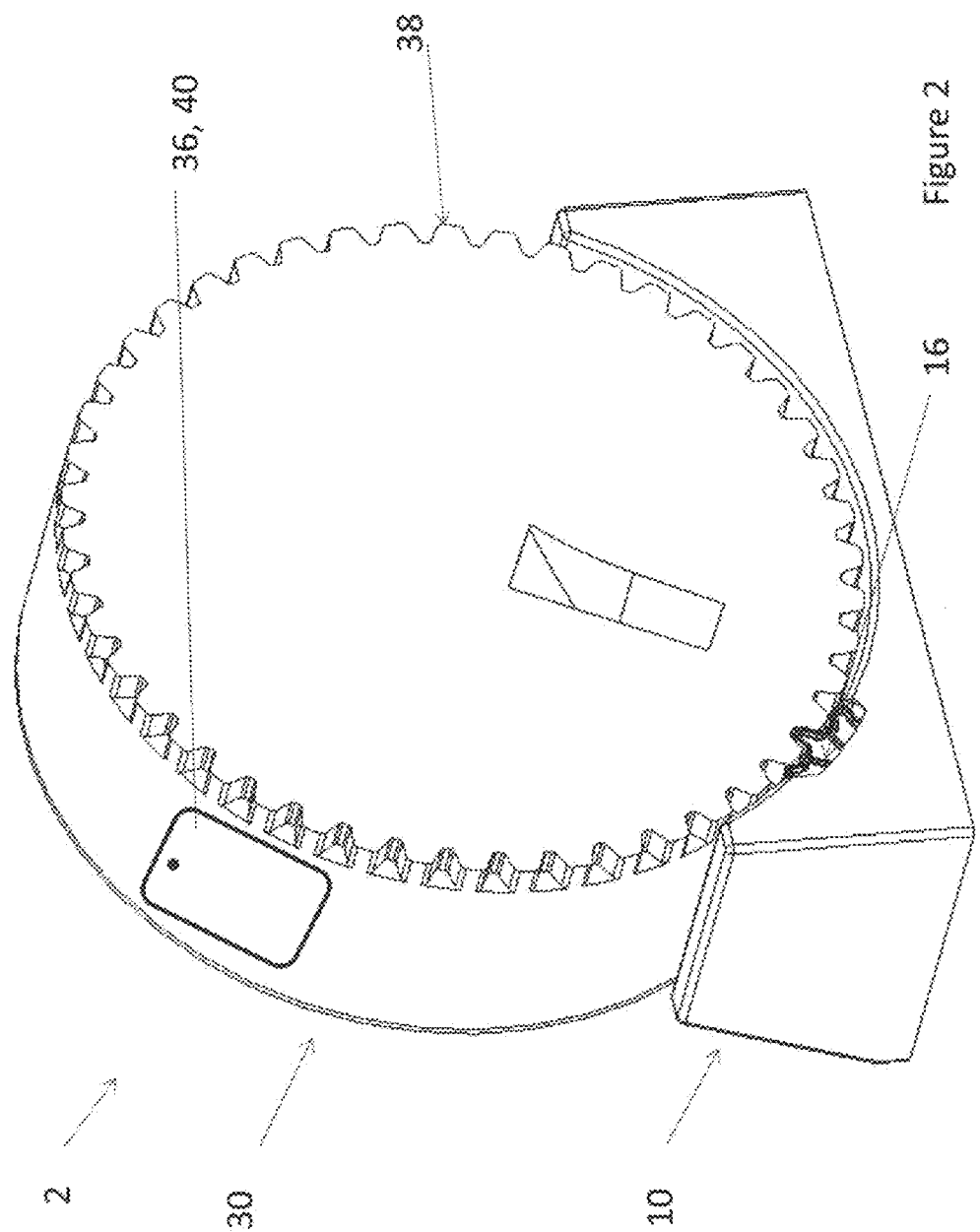
FIG. 2 illustrates rear perspective view of one possible feeding device.

FIG. 2 illustrates a back of a feeder 2. The base assembly 10 includes a drive gear 16. The drive gear 16 is in communication with a rotatable housing 30. The rotatable housing includes a track 38 and a fill door that may be used as an automatic fill chute door 40, a full chute door 36, or both so that food can be fed from a refill bin (not shown) or by a user through the automatic fill chute door 40 and/or fill chute door and into the rotatable housing 30.

Figure 3:
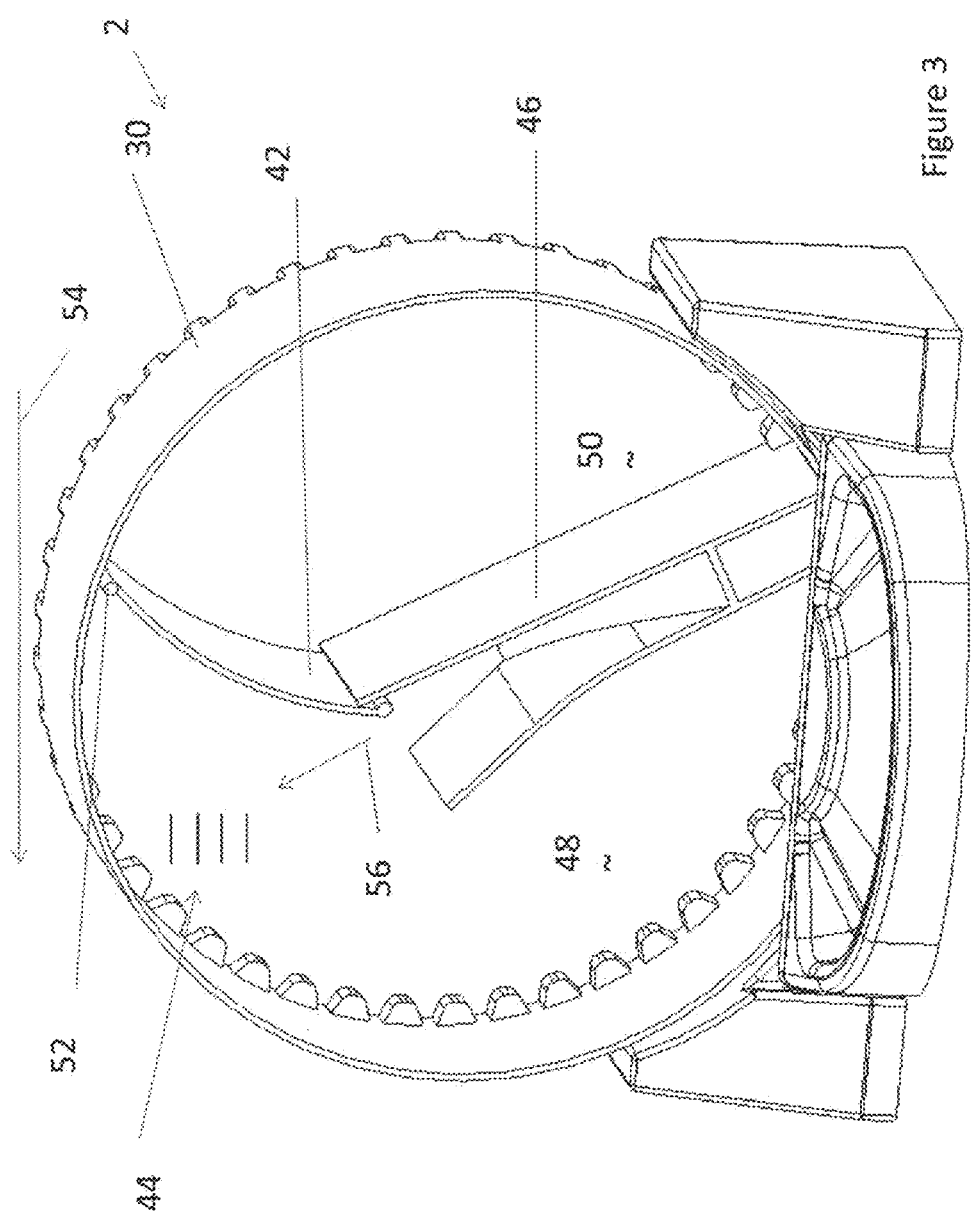
FIG. 3 illustrates a perspective view of the feeding device of FIG. 1 in a home position with the rotatable housing cover removed so that the internal components are exposed.

FIG. 3 illustrates the feeder 2 of FIG. 1, in the home position, with the rotatable housing cover removed so that the internal components are exposed. The rotatable housing 30 includes a pivotable portioning divider 42. As illustrated, the pivotable portioning divider 42 is in contact with a food chute 46 due to gravity. During a feeding cycle the rotatable housing 30 rotates in the direction as indicated by arrow 54 so that food travels from a storage portion 48 to a divider storage portion 50. As the rotatable housing 30 rotates in the dispensing direction 54 the pivotable portioning divider 42 rotates around the axis 52 in the direction 56 so that the pivotable portioning divider 42 contacts one of the divider stops 44.

Figure 4A:
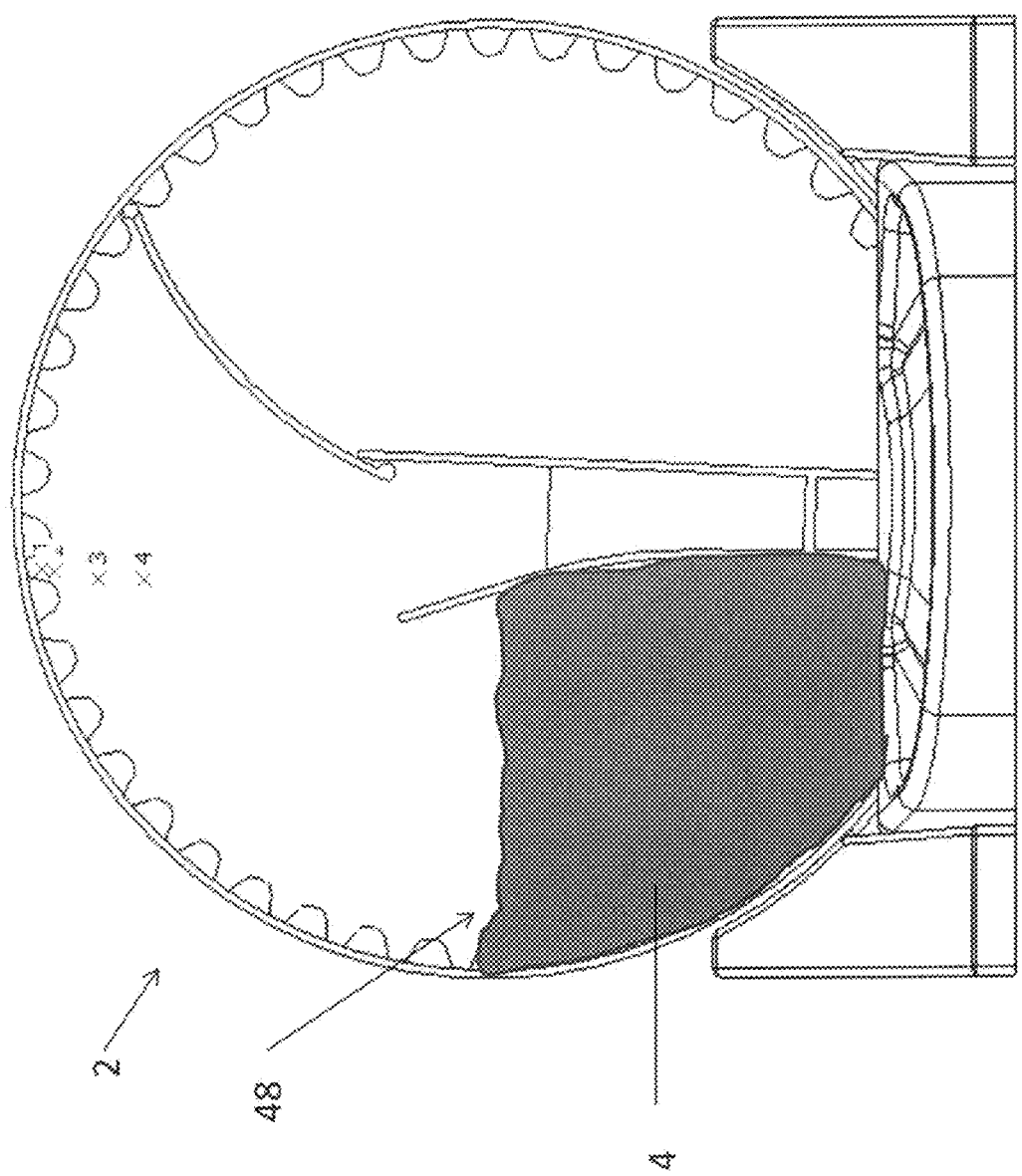

FIG. 4A illustrates the feeder 2 in the home position with the food 4 located in the storage portion 48.

FIG. 4B1 illustrates the feeder as the feeder rotates so that the food chute 46 and food 4 are rotated in the dispensing direction 54. As the feeder rotates in the dispensing direction 54 the pivotable portioning divider 42 rotates towards the divider stops 44 and the food 4 begins to flow in the dispensing direction 54 towards the divider stops 44. FIG. 4B2 illustrates a close up view of the divider stops 44 and the pivotable portioning divider 42 of FIG. 4B1. As the pivotable portioning divider 42 pivots the pivotable portioning divider 42 contacts the divider stop 44 selected by the user so that the predetermined volume of food 4 (as illustrated) is divided by the pivotable portioning divider 42.

FIG. 4C illustrates the food 4 as the food 4 is transferred from the storage portion 48 to the divider storage portion 50. As the food moves in the dispensing direction 54 the pivotable portioning divider 42 prevents segregated food 6 from continuing to travel to the divider storage portion with the food 4. The segregated food 6 flows under the pivotable portioning divider 42 until the volume under the pivotable portioning divider 42 is full.

FIG. 4D illustrates the pivotable portioning divider 42 when the volume under the pivotable portioning divider 42 is full of segregated food 6 and a predetermined amount of food 6 has been segregated from the remaining food 4.

Figure 4E:
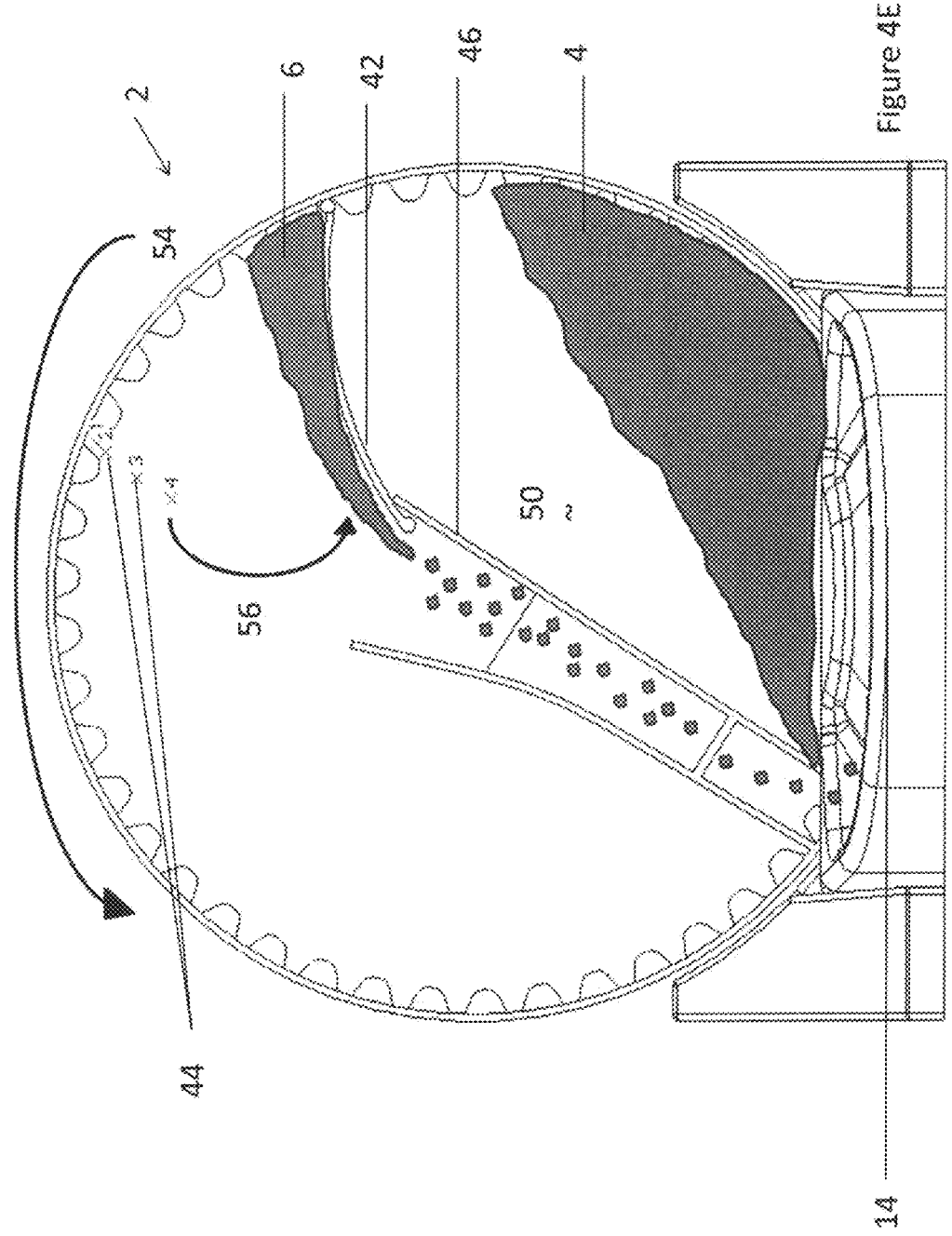

FIG. 4E illustrates the pivotable portioning divider 42 rotating in the direction 56 away from the divider stops 44 and into contact with the food chute 46 as the feeder rotates in the direction 54. The pivotable portioning divider 42 pivots into contact the food chute 42 and the segregated food 6 is transferred to the bowl 14 through the food chute 46 while the other food 4 remains in the divider storage portion 50.

FIG. 4F illustrates the remaining segregated food 6 falling down the food chute 46 and into the bowl 14 as the feeder 2 rotates in the direction 56 past a home position plane 60.

The pivotable portioning divider 42 remains in contact with the food chute 46 during the rotation past the home position plane 60. The food 4 remains on the divider storage portion 50 side of the food chute during rotation past the home position plane 60.

FIG. 4G illustrates the feeder 2 after the feeder has fully rotated in the dispensing direction and all of the segregated food 6 has been dispensed, the feeder 2 begins to rotate back in the return direction 58. As the feeder 2 rotates in the return direction 58 the pivotable portioning divider 42 remains in contact with the food chute 46 and when the food 4 achieves its angle of repose, the food 4 begins to move from the divider storage portion 50 to the storage portion 48.

FIG. 4H illustrates feeder 2 rotating in the return direction 58 so that the food 4 moves over the pivotable portioning divider 42 as the pivotable portioning divider 42 rotates in the direction 56 towards the divider stops 44.

FIG. 4I illustrates the food 4 extending over the portioning divider stop 42 as the food travels from the divider storage portion 50 to the storage portion 48 during rotation in the return direction 58.

FIG. 4J illustrates the feeder 2 rotating in the return direction 58 past the home position plane 60 so that the food 4 is leveled below the food chute 46. The pivotable portioning divider 42 is moved into contact with the food chute 46 so that the pivotable portioning divider 42 is in a position for another feeding cycle.

FIG. 5A illustrates the feeder and another possible configuration for the divider stops 44. The divider stops 44 are connected to the rotatable housing 30 so that as the rotatable housing 30 is rotated by the drive gear 16 food is portioned by the pivotable portioning divider 42. As the rotatable housing 30 rotates the refill bin 80 remains stationary. The refill bin 80 includes a refill bin chute door 82 that as illustrated is aligned with a wall of the rotatable housing 30; however, when the refill bin chute door 82 and the automatic fill chute door 40 align food 4 is transferred into the rotatable housing 30. The food 4 may also be put into the rotatable housing 30 by a user putting food through the fill door 34. The food 4 may be placed through the fill door 3 until the food reaches the fill line 62.

Figure 5B:
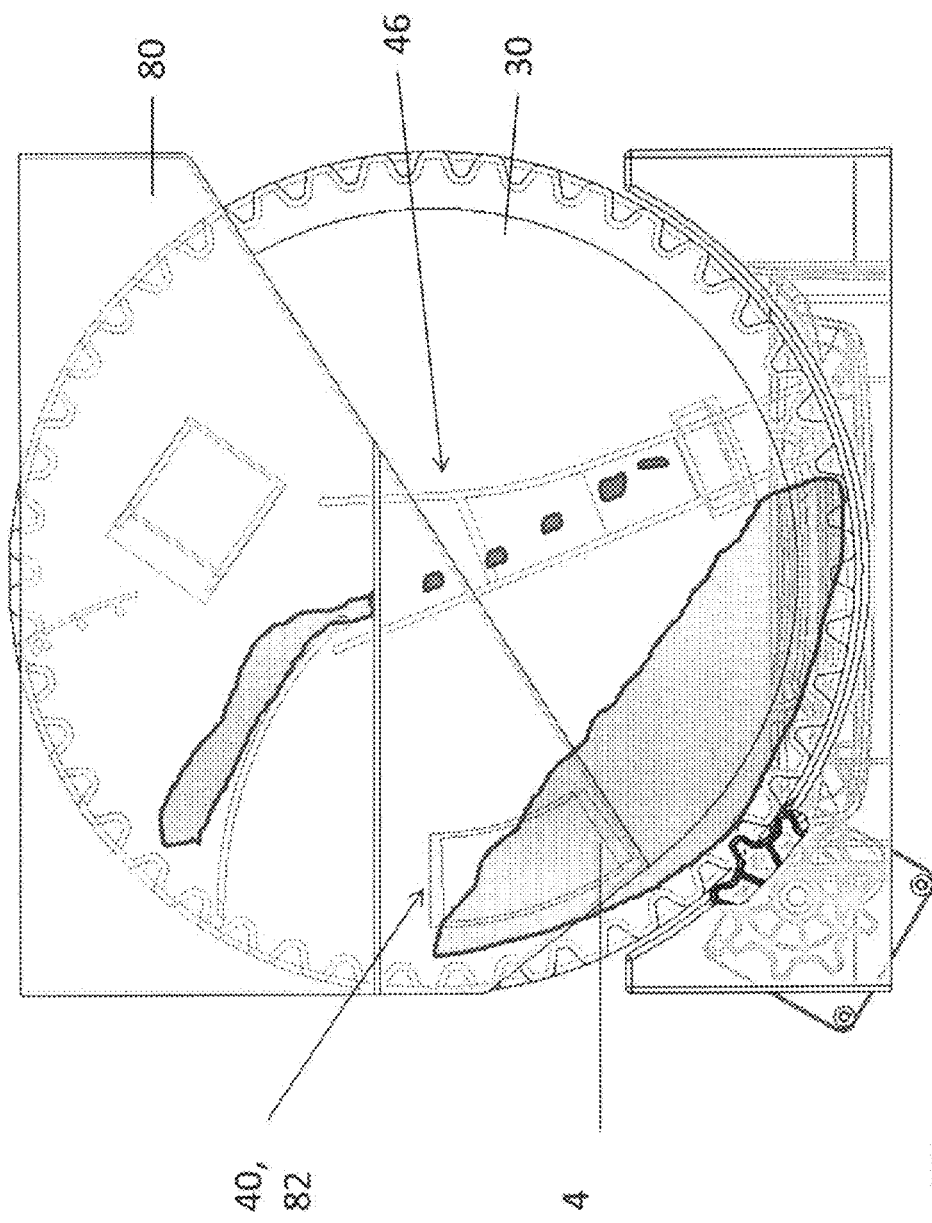

FIG. 5B illustrates the refill bin chute door 82 of the refill bin 80 aligned with the automatic fill chute door 40 of the rotatable housing 30 so that food 4 enters the rotatable housing 30. Food 4 will continue to enter the rotatable housing 30 until the food 4 covers the automatic fill chute door 40. As illustrated, the food 4 is partially covering the automatic chute door 40. Food 4 is also being dispensed through the food chute 46.

Figure 5C:
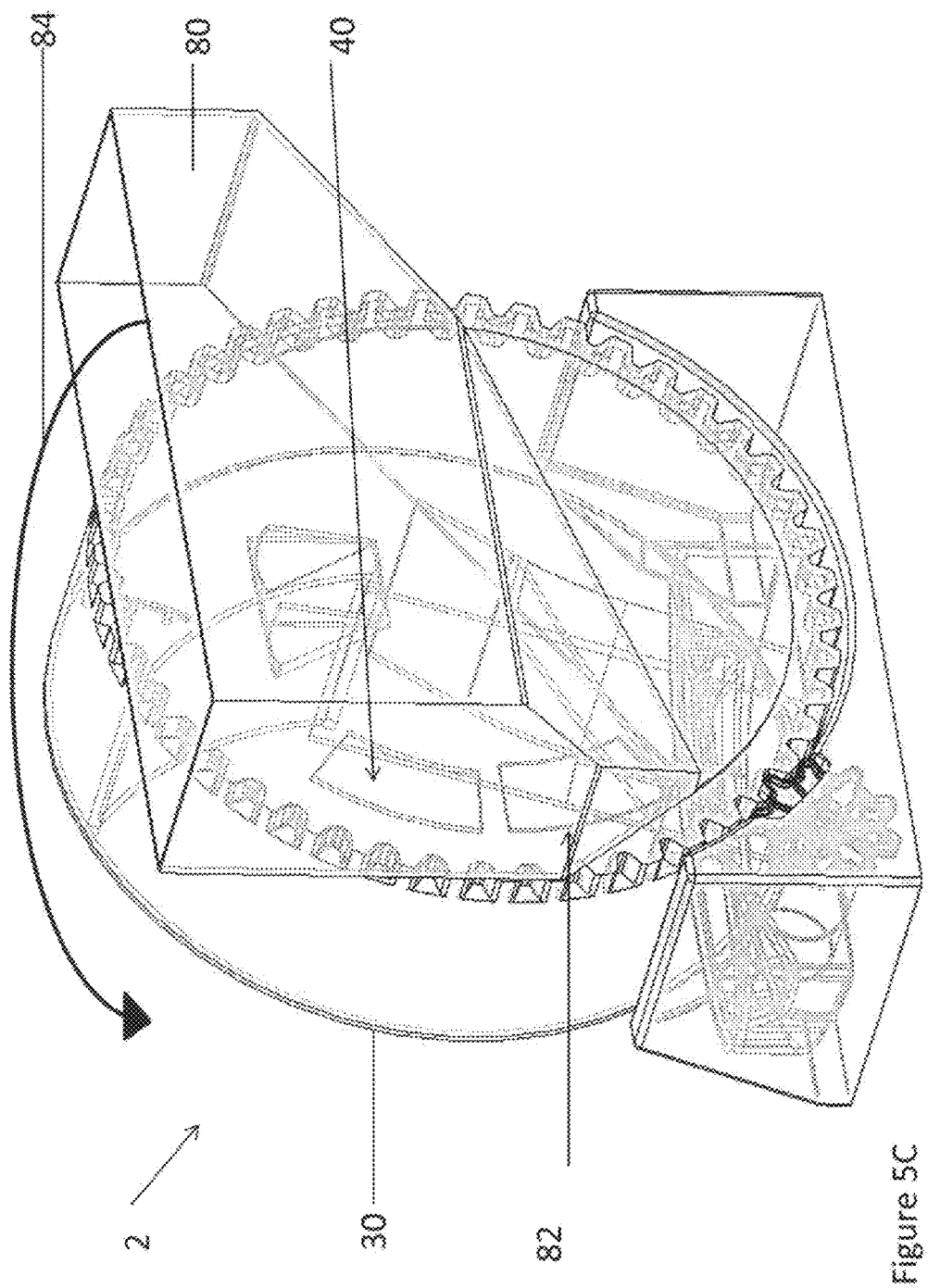

FIG. 5C illustrates a feeder 2 connected to a refill bin 80. The rear of the rotatable housing 30 includes an automatic fill chute door 40 that rotates with the rotatable housing 30.

Figure 5E:
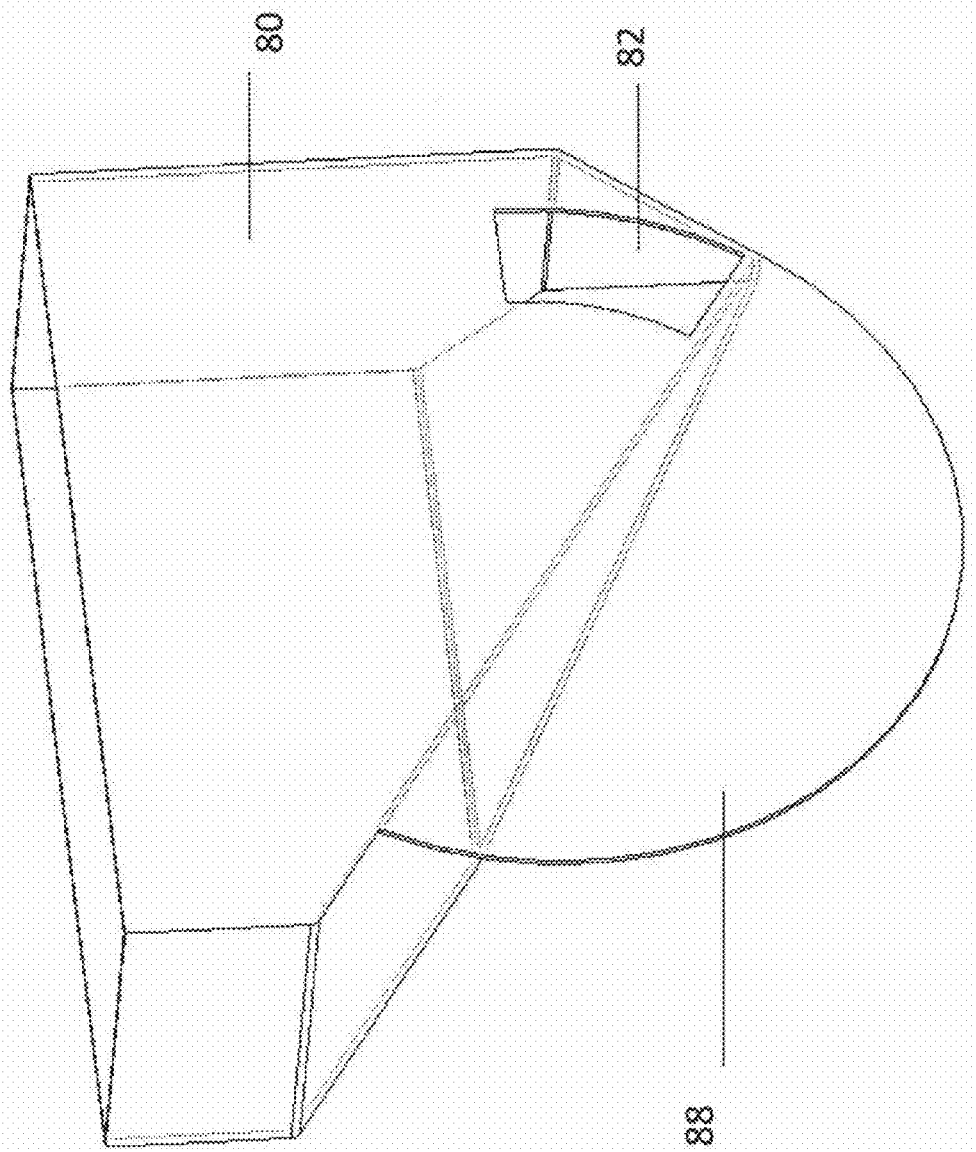

The refill bin 80 includes a refill bin chute door 82 that is positioned so that it aligns with the automatic fill chute door 40. The refill bin 80 is illustrated as being transparent so that when the rotatable housing 30 rotates in the direction 84 until the fill chute door 40 and the refill bin chute door 82 align so that food is transferred into the rotatable housing 30. FIG. 5D illustrates the refill bin 80 and the rotatable housing 30 connected without the components being transparent. FIG. 5E illustrates a rear view of the refill bin 80 with refill bin chute door 82 and a refill bin stop 88 that covers the automatic fill chute door (not shown) of the rotatable housing.

FIG. 6 illustrates a cross-sectional view of the rotatable housing 30 being connected to a refill bin 80. The automatic fill chute door 40 of the rotatable housing is rotated so that the automatic fill chute door 40 and the refill bin chute door 82 are aligned so that food can be transferred from the refill bin 80 to the rotatable housing 30. The refill bin 80 includes a transfer feature 86 that assists in transferring food from the refill bin 80 to the rotatable housing 30.

FIG. 7 illustrates a feeder 2 including a pivotable portioning divider 44 having an eccentric divider stop 100. The eccentric divider stop 100 is adjustable so that the volume of food dispensed can be varied.

Figure 8:
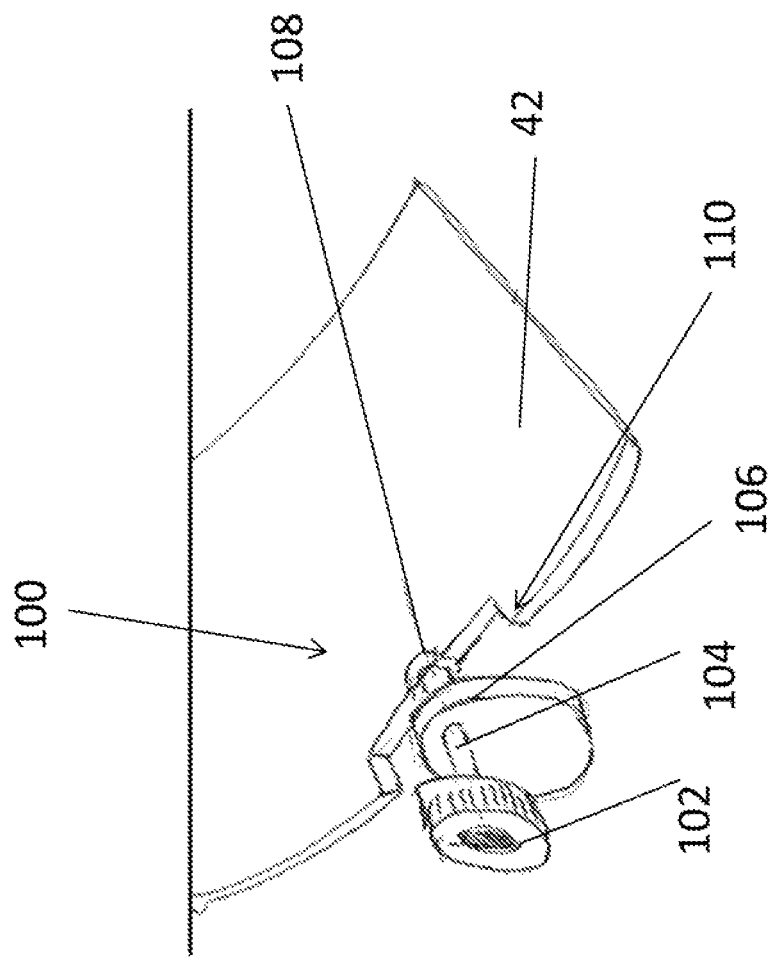
FIG. 8 illustrates a cross sectional view of an eccentric divider stop.

FIG. 8 illustrates an enlarged view of an eccentric divider stop 100 on a pivotable portioning divider 42. The pivotable portioning divider 42 includes a divider pocket 110 for housing the eccentric divider stop 100. The eccentric divider stop 100 includes a knob 102 attached to an axle 104. As the knob 102 rotates the axle 104 a lobe 106 is rotated. A ratchet interface 108 is attached to the axle 104 and prevents the lobe 106 from moving after rotation of the knob 102.

FIG. 9 illustrates a top view of the eccentric divider stop 100. The axle 104 extends through a rotatable housing cover 32 and into contact with a pivotable portioning divider 42. A knob 102 is located outside of then rotatable housing cover 32 so that an owner can rotate the knob 102 and the lobe 106 to select the amount of food portioned by the pivotable portioning divider 42. A ratchet interface 108 is attached to the axle 104 so that when the lobe 106 is rotated to a position the ratchet interface 108 maintains the position of the lobe 106 so that the lobe 106 determines the volume of food portioned. The lobe 106 is located in a divider pocket 110 on the pivotable portioning divider 42.

Figure 10B:
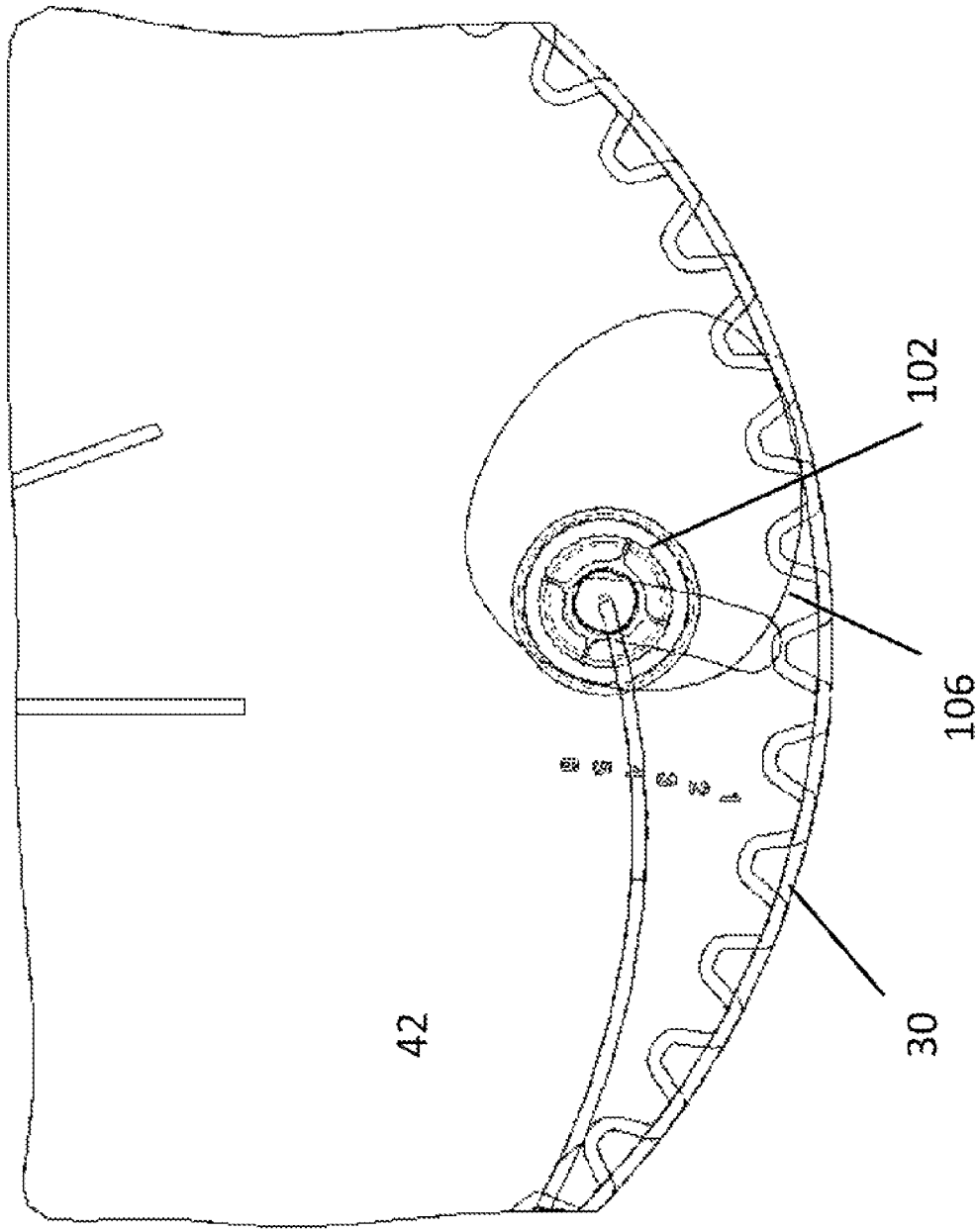

FIGS. 10A-10C illustrates the eccentric divider stop 100 adjusted to set the volume of food portioned by the pivotable portioning divider 42. As shown in FIG. 10A the pivotable portioning divider 42 is rotated until the lobe 106 contacts the rotatable housing 30. The knob 102 is used to adjust the position of the lobe 106 and the ratchet interface 108 (not shown) holds the lobe in place. FIG. 10A illustrates the pivotable portioning divider 42 at its maximum volume. As shown in FIG. 10B the lobe 106 is adjusted so that the largest dimension of the lobe 106 is positioned away from the rotatable housing 30 so that a side of the lobe 106 contacts the rotatable housing 30. The knob 102 of the eccentric divider stop 100 is used to adjust the lobe 106 and the distance between the pivotable portioning divider 42 and the rotatable housing 30. FIG. 10B illustrates the eccentric divider stop 100 in a medium volume.

As shown in FIG. 10C the lobe 106 is rotated so that the smallest dimension of the lobe 106 extends between the pivotable portioning divider 42 and the rotatable housing 30. The knob 102 is used to move the eccentric divider stop 100 so that the volume is adjusted. FIG. 10C illustrates the eccentric divider stop 100 at its smallest volume.

Figure 11:
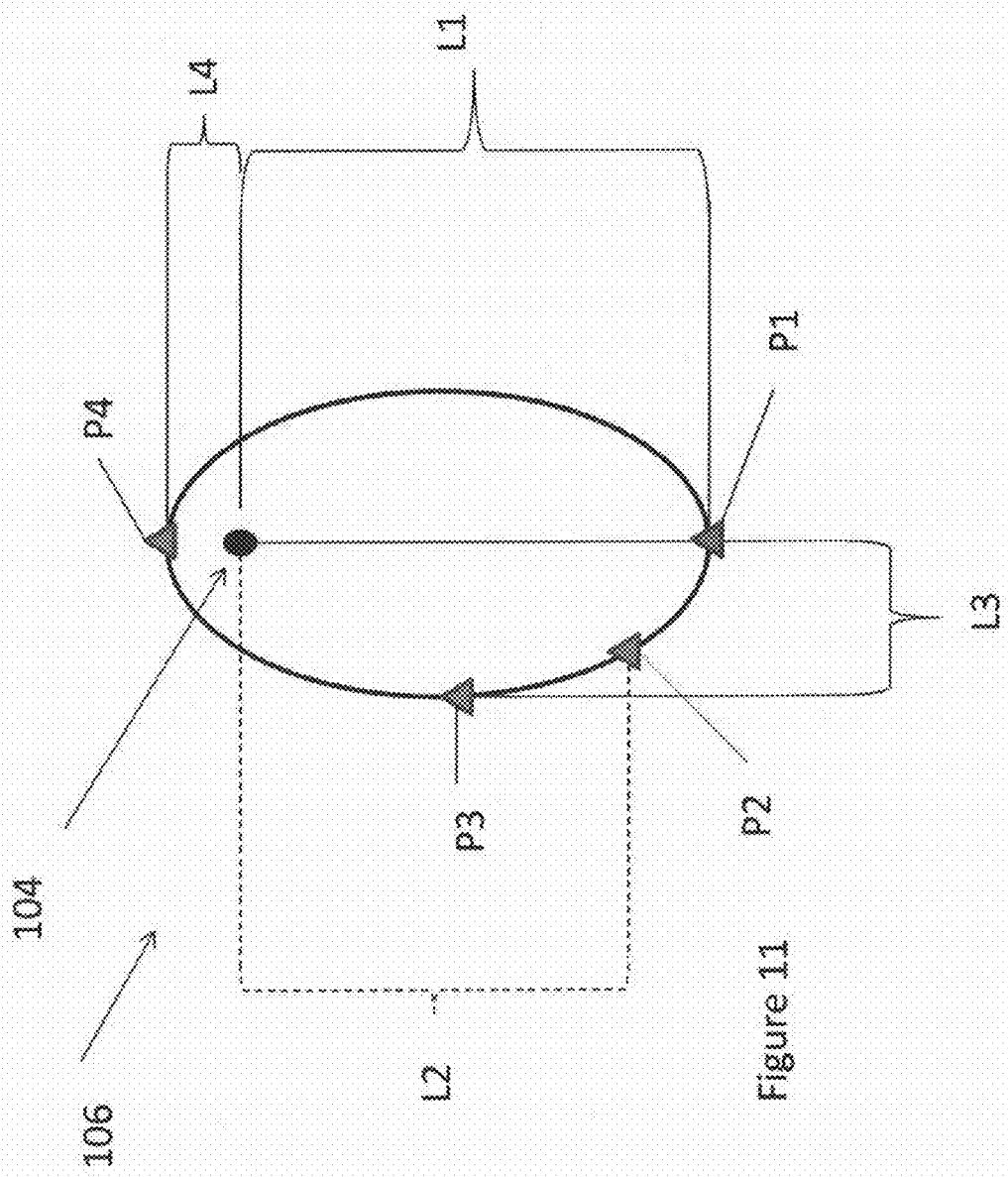
FIG. 11 illustrates various adjustment positions of the eccentric divider stop.

FIG. 11 illustrate various possible positions of the lobe 106 as the lobe 106 is rotated around the axle 104 as is illustrated in FIG. 10A-10C. The position of the lobe 106 determines the volume created by the pivotable portioning divider 42 (not shown). When the lobe 106 is rotated to position one (P1) the lobe creates a maximum volume. The maximum volume has a length of a gap that is the distance (L1) that is measured from (P1) to the axle 104. As the lobe is rotated to a second position (P2) the volume is decreased. A length (L2) is measured from the axle 104 to (P2) and the length (L2) is less than the length (L1). As the lobe is rotated to a third position (P3) the volume is decreased. A length (L3) is measured from the axle 104 to (P3) and the length (L3) is less than both (L2) and (L1). As the lobe is rotated to a fourth position (P4) the volume is at its minimum. A length (L4) is measured from the axle 104 to (P4) and the length (L4) is less than (L3), (L2), and (L1). Positions one through four are not restrictive and are only intended for illustrative purposes. The lobe may be rotated to virtually any position on the lobe to vary the length and ultimately the volume of food segregated.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

The omission in the following claims of any aspect of subject matter that is disclosed herein is not a disclaimer of such subject matter, nor should it be regarded that the inventors did not consider such subject matter to be part of the disclosed inventive subject matter.

I claim:

1. A feeder comprising:
   a. a base assembly;
   b. a rotatable housing supported by the base assembly;
   wherein the rotatable housing contains and dispenses food and comprises:
      i. a pivotable portioning divider for segregating a portion of food from the food contained within the rotatable housing;
      ii. an adjustment mechanism for adjusting the position of the pivotable portioning divider so that the pivotable portioning divider can be adjusted to vary an amount of food dispensed by the feeder;
      iii a food chute for dispensing food from the rotatable housing;
      iv. wherein the pivotable portioning divider, the food chute and the rotatable housing form a divider storage portion; and
   wherein the pivotable portioning divider includes an axis along its length and the pivotable portioning divider rotates around the axis as the rotatable housing rotates.

2. The feeder of claim 1, wherein the adjustment mechanism is an eccentric divider stop connected to the pivotable portioning divider and assists in selecting a volume of food to be segregated by the pivotable portioning divider.

3. A feeder comprising:
 a. a base assembly;
 b. a rotatable housing supported by the base assembly;
 wherein the rotatable housing contains and dispenses food and comprises:
  i. a pivotable portioning divider for segregating, a portion of food from the food contained within the rotatable housing;
  ii. an adjustment mechanism for adjusting the position of the pivotable portioning divider so that the pivotable portioning divider can be adjusted to vary an amount of food dispensed by the feeder;
  iii. a food chute for dispensing food from the rotatable housing;
  iv. wherein the pivotable portioning divider, the food chute, and the rotatable housing form a divider storage portion; and
 wherein the adjustment mechanism is one or more divider stops which come(s) into contact with the pivotable portioning divider during rotation of the rotatable housing to prevent the pivotable portioning divider from rotating beyond a predetermined point.

4. The feeder of claim 3, wherein each of the one or more divider stops represents a volume between the rotatable housing and the pivotable portioning divider so that food in the volume selected is divided from the food of the rotatable housing as the food is transferred to the divider storage portion and a constant volume of food is dispensed.

5. The feeder of claim 3, wherein the rotatable housing includes at least four of the one or more divider stops and each of the one or more divider stops represents from about a quarter a cup to about one and a half cups.

6. The feeder of claim 3, wherein the rotatable housing includes a storage portion so that as food is moved from the storage portion to the divider storage portion food is retained by the pivotable portioning divider.

7. The feeder of claim 3, wherein the rotatable housing includes at least one external port for allowing food to be removed from the rotatable housing, to fill the rotatable housing, or both.

8. The feeder of claim 3, wherein the food chute is aligned with at least one external port so that food is funneled from the pivotable portioning divider through the external port and dispensed from the feeder.

9. The feeder of claim 8, wherein the pivotable portioning divider pivots into contact with the food chute so that the amount of food divided by the pivotable portioning divider is dispensed through the food chute.

10. The feeder of claim 3, wherein the base assembly includes a food bowl so that food dispensed through the food chute is collected within the food bowl.

11. The feeder of claim 10, wherein the food bowl includes a mass sensor so that once a predetermined amount of food is removed from the food bowl the food bowl is activated so that more food is dispensed.

12. The feeder of preceding claim 3, wherein the rotatable housing is cylinder shaped and includes a track around a circumference of the rotatable housing;
 wherein the rotatable housing is connected to a refill bin that automatically refills the rotatable housing;
 wherein the base assembly includes a drive gear for rotating the rotatable housing;
 wherein a constant volume of food is dispensed regardless of rotational speed of the rotatable housing, rotation time of the rotatable housing, aperture size of the food chute, aperture size of at least one external port, or a combination thereof; and
 wherein at least a portion of the rotatable housing is transparent so that a volume of food in the rotatable housing is visible, a plurality of moving components are visible, or both.

13. A feeder comprising:
 a. a base assembly;
 b. a rotatable housing supported by the base assembly;
 wherein the rotatable housing contains and dispenses food and comprises:
  i. a pivotable portioning divider for segregating a portion of food from the food contained within the rotatable housing;
  ii. an adjustment mechanism for adjusting the position of the pivotable portioning divider so that the pivotable portioning divider can be adjusted to vary an amount of food dispensed by he feeder;
  iii. a food chute for dispensing food from the rotatable housing;
  iv. wherein the pivotable portioning divider, the food chute, and the rotatable housing form a divider storage portion; and
 wherein the adjustment mechanism is an eccentric divider stop connected to the pivotable portioning divider and assists in selecting a volume of food to be segregated by the pivotable portioning divider;
 wherein the eccentric divider stop includes a lobe having a plurality of lengths so that as the lobe is adjusted the amount of food dispensed by the feeder is adjusted.

14. The feeder of claim 13, wherein the eccentric divider stop includes an axle that connects the pivotable portioning divider to a knob so that the eccentric divider stop can be adjusted.

15. The feeder of claim 13, wherein the eccentric divider stop includes a ratchet interface for maintaining the position of the eccentric divider stop.

16. The feeder of claim 13, wherein the pivotable portioning divider includes a divider pocket for accommodating the eccentric divider stop.

17. A method comprising:
 rotating the rotatable housing of the feeder of claim 6; and
 selecting a divider stop position so that
 a predetermined, volume of food is segregated for dispensing.

18. The method of claim 17, wherein the method includes a step of moving the pivotable portioning divider into contact with one of the one or more divider stops so that the predetermined volume is formed between the pivotable portioning divider and the rotatable housing.

19. The method of claim 17, wherein the method includes a step of rotating the rotatable housing causing the pivotable portioning divider to move with gravity into contact with the food chute so that food is dispensed from the rotatable housing.

20. The method of claim 19, wherein the method includes a step of transferring food from the storage portion to the divider storage portion of the rotatable housing, from the divider storage portion to the storage portion of the rotatable housing, or both, and
 wherein the divider stop includes a knob for adjusting the volume of food dispensed from the feeder and the knob is rotated so that a volume between the rotatable housing and the pivotable portioning divider is adjusted.

* * * * *